(12) United States Patent
Rönneke et al.

(10) Patent No.: US 9,730,056 B2
(45) Date of Patent: Aug. 8, 2017

(54) SYSTEM, METHOD, AND APPARATUS FOR FACILITATING SELECTION OF A SERVING NODE

(71) Applicant: TELEFONAKTIEBOLAGET L M ERICSSON (PUBL), Stockholm (SE)

(72) Inventors: Hans Bertil Rönneke, Kungsbacka (SE); Lars-Bertil Olsson, Angered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/826,896

(22) Filed: Aug. 14, 2015

(65) Prior Publication Data

US 2017/0048695 A1  Feb. 16, 2017

(51) Int. Cl.
| | |
|---|---|
| H04W 8/24 | (2009.01) |
| H04W 8/02 | (2009.01) |
| H04W 8/22 | (2009.01) |
| H04W 48/18 | (2009.01) |
| H04W 80/04 | (2009.01) |
| H04W 92/10 | (2009.01) |
| H04W 48/20 | (2009.01) |

(52) U.S. Cl.
CPC .............. *H04W 8/24* (2013.01); *H04W 8/02* (2013.01); *H04W 8/22* (2013.01); *H04W 48/18* (2013.01); *H04W 48/20* (2013.01); *H04W 80/045* (2013.01); *H04W 92/10* (2013.01)

(58) Field of Classification Search
CPC ....................................................... H04W 8/24
See application file for complete search history.

(56) References Cited

U.S. PATENT DOCUMENTS 8,887,257 B2 * 11/2014 Haggerty ............ H04L 63/0272
  726/9
2006/0023712 A1   2/2006 Shaheen
(Continued)

OTHER PUBLICATIONS

3GPP, 3rd Generation Partnership Project; Technical Specification Group Services and System Aspects; Study on Machine-Type Communications (MTC) and other mobile data applications enhancements (Release 12), 3GPP TR 23.887 V12.0.0, 2013, 151 pages.

(Continued)

*Primary Examiner* — Michael T Vu
(74) *Attorney, Agent, or Firm* — Rothwell, Figg, Ernst & Manbeck, P.C.

(57) ABSTRACT

A method, apparatus, and system is provided for establishing communication between a wireless communication device (WCD) and one of a plurality of serving nodes (SNs). Each of the SNs is configured to perform mobility management and session management. The WCD determines information that identifies which WCD-SN protocol type is supported by or is being used by the WCD. Each of the WCD-SN protocol types is a version, subset, or variant of a protocol used to support mobility and session management. The identified protocol type is compatible with one or more of the SNs and is not compatible with another one or more of the SNs. The WCD transmits, to a base station controller, a message that includes the information on which WCD-SN protocol type is supported by the WCD or is being used by the WCD. The controller selects, based on the protocol type, one of the SNs.

20 Claims, 16 Drawing Sheets

(56) References Cited

U.S. PATENT DOCUMENTS

2009/0232022 A1      9/2009  Savolainen et al.
2012/0258674 A1*    10/2012  Livet .................. H04B 1/38
                                                                455/73
2012/0287854 A1    11/2012  Xie et al.
2014/0211728 A1     7/2014  Zembutsu et al.

OTHER PUBLICATIONS

3GPP, 3rd Generation Partnership Project; Technical Specification Group GSM/EDGE Radio Access Network; Cellular System Support for Ultra Low Complexity and Low Throughput Internet of Things; (Release 13), 3GPP TR 45.820 V1.3.1, 2015, 271 pages.
Intel, "TR 23.720 Skeleton", SA WG2 Meeting #110, S2-152283, 2015, 8 pages.
International Search Report and the Written Opinion of the International Searching Authority, issued in corresponding International Application No. PCT/EP2016/064252, dated Oct. 24, 2016, 18 pages.

* cited by examiner

| NAS Type | Device Type | Serving Node(s) |
|---|---|---|
| 1 (Legacy NAS) | Category 0 | Undefined |
| | NB Device | Undefined |
| | Category 1-10 | MME 241 |
| 2 (CIoT NAS) | Category 0 | C-SGN 261/C-SGN 271 |
| | NB Device | MME 251/MME 252 |
| | Category 1-10 | Undefined |

FIG. 3A

| NAS Type | Core Network | Device Type | Serving Node(s) in Core Network |
|---|---|---|---|
| 1 (Legacy NAS) | undefined | Category 0 | Undefined |
| | undefined | NB Device | Undefined |
| | DCN 240 | Category 1-10 | MME 241 |
| 2 (CIoT NAS) | DCN 260, DCN 270 | Category 0 | C-SGN 261/C-SGN 271 |
| | DCN 250 | NB Device | MME 251/MME 252 |
| | undefined | Category 1-10 | Undefined |

FIG. 3B

SYSTEM, METHOD, AND APPARATUS FOR FACILITATING SELECTION OF A SERVING NODE

TECHNICAL FIELD

This disclosure relates to a system, method, and apparatus for facilitating selection of a serving node (e.g., a serving node in a wireless network).

BACKGROUND

In a wireless communications network, a wireless communication device (WCD) may communicate with a serving node (SN) of a core network (CN) via a radio access network (RAN), such as the evolved UMTS RAN (e-UTRAN).

The WCD may be, e.g., a mobile station (MS) or a user equipment (UE) or a Cellular Internet-of-Things (CIoT) device, such as a mobile phone, laptop or similar device with wireless capability. It may be embedded (e.g., as a card or a circuit arrangement) in and/or attached to various other devices, such as in various laptop or tablet computers, or other mobile consumer electronics, in home appliances, sensors, meters, accentuators, or embedded in vehicles, boats, or airplanes or other transportation devices.

The RAN may cover a geographical area which is divided into cell areas, with each cell area being served by a base station, e.g. a Radio Base Station (RBS). One example of radio access networks is a GSM EDGE Radio Access Network (GERAN). Another example of RANs is a Universal Mobile Telecommunications System (UMTS) Terrestrial RAN (UTRAN), which use a base stations called a "NodeB" or "B node." The base stations communicate via an air interface with WCDs within range of the base stations. Each base station may cover one of the cell areas. UMTS is a third generation wireless communication system, which evolved from the Global System for Mobile Communications (GSM), and is intended to provide improved mobile communication services based on Wideband Code Division Multiple Access (WCDMA) access technology. Still another example of RANs is an enhanced or evolved UTRAN (e-UTRAN), which uses a base station called an enhanced or evolved NodeB (eNB). These RANs and base stations may be used in LTE systems.

A base station of a RAN may have a base station controller. For UTRANs, the base station controller may be a Radio Network Controller (RNC) or a Base Station Controller (BSC) that is shared by several NodeBs. The NodeBs may be connected by, e.g., landlines or microwave links, to the RNC or BSC. The RNC or BSC may supervise and coordinates various activities of the plurality of base stations connected thereto. For UTRANs, the NodeB may be connected to a GPRS core network. For e-UTRAN, each eNodeB may have a base station controller located in the eNodeB, and may be connected to a core network called an evolved packet core (EPC) network. An example of an e-UTRAN and EPC network of a LTE system is illustrated in FIG. 15, and an example of a UTRAN and GPRS core network of a UMTS system is illustrated in FIG. 16.

The RANs and core networks may be part of a public land mobile network (PLMN) that provides Internet access or other form of network connectivity to a WCD. For instance, Verizon or another service provider or operator may operate a PLMN that deploys a plurality of RANs and core networks to provide Internet connectivity to customers' WCDs.

Examples of a core network include a general packet radio service (GPRS) core network and a evolved packet core (EPC) or system architecture evolution (SAE) core network. As illustrated in FIGS. 15 and 16, these core networks (e.g., core network 240) may include nodes such as a mobility management entity (MME) 241, a Serving Gateway (SGW) 244, a Policy and Charging Rules Function (PCRF) node 246, a Home Subscriber Server (HSS) 243, a Serving GPRS Support Node (SGSN) 242, and/or a network gateway node. The network gateway nodes may provide connectivity for the radio terminals of the communication network to one or more external Packet Data Networks (PDNs). Examples of the network gateway node are the Gateway GPRS Support Node (GGSN) and the PDN Gateway (PGW) 245. Some core networks may be assigned to a specific subscriber or specific set of subscribers, and may be referred to as dedicated core networks (DCNs).

The Mobility Management Entity (MME) 241 is a serving node for a core network in a LTE system. It may be responsible for mobility management, such as idle mode UE tracking and paging procedure, including retransmissions. It may be responsible for session management, such as the bearer activation/deactivation process and the establishing of a PDN connection for a UE. It may be responsible for choosing the SGW 243 for a UE 201 at an initial attach process and at the time of intra-LTE handover involving Core Network (CN) node relocation. It may be responsible for authenticating a user (by interacting with the HSS 243).

In LTE systems, a UE 201 and MME 241 may communicate via Non-Access Stratum (NAS) signaling, which terminates at the MME 241 and may be responsible for generation and allocation of temporary identities to UEs. The MME 241 may check the authorization of the UE 201 to camp on the service provider's Public Land Mobile Network (PLMN) and enforce UE roaming restrictions. The MME 241 may be the termination point in the network for ciphering/integrity protection for NAS signaling and may handle security key management. The MME 241 may also provide the control plane function for mobility between LTE and 2G/3G access networks with the S3 interface terminating at the MME 241 from a SGSN 242. The MME 241 may also terminate the S6a interface towards the home HSS 243 for roaming UEs.

The Serving GPRS Support Node (SGSN) 242 is a serving node for a GPRS core network. It may be responsible for the delivery of data packets from and to radio terminals, such as mobile stations within its geographical service area. Its tasks may include packet routing and transfer, mobility management (attach/detach and location management), session management (e.g., logical link management), and authentication and charging functions. The SGSN may have a location register that stores location information (e.g., current cell, or current Visitor Location Register (VLR)) and user profiles (e.g., International Mobile Station Identity (IMSI)) of all GPRS users registered with this SGSN.

In FIG. 15, the Serving Gateway (SGW) 244 may route and forward user data packets, while also acting as the mobility anchor for the user plane during inter-eNB handovers, and as the anchor for mobility between LTE and other 3GPP technologies, such as those involving UTRAN 217 AND GERAN 218, which may communicate with the SGW 244 via the S4 interface. The PDN Gateway (PGW) 245 is a network gateway node that provides connectivity for the UE 201 to one or more external Packet Data Networks (PDNs) by being the point of exit and entry of traffic for the UE 201. A UE 201 may have simultaneous connectivity with more than one PGW for accessing multiple PDNs. The Policy and Charging Rules Function (PCRF) node 246 may determine policy rules in real-time with respect to the radio terminals of the system. The PCRF node 246 may provide the PGW 245 with such rules and/or policies to be used by the PGW, which may perform a Policy and Charging Enforcement Function (PCEF). The Home Subscriber Server (HSS) 243 is a database that may contain user-related and subscriber-related information. It may also provide support functions in mobility management, call and session setup, user authentication, and access authorization.

In a GPRS core network, the Gateway GPRS Support Node (GGSN) is a network gateway node that provides connectivity for radio terminals such as UEs or MSs to one or more external Packet Data Networks (PDNs) by being the point of exit and entry of traffic for the radio terminal. The GGSN may be responsible for the interworking between the GPRS network and one or more external Packet Data Networks (PDNs), like the Internet and X.25 networks. The GGSN may be the anchor point that enables the mobility of the user terminal in the GPRS/UMTS networks.

Wireless networks may be used to support Internet-of-Things (IoT), which involves a network of physical objects such as indoor appliances, sensors, medical devices, and other devices with, e.g., wireless communication capability. The wireless network may be a cellular-based network such as a UMTS or LTE network, and may be part of a Cellular Internet-of-Things (CIoT) system.

A plurality of dedicated core networks (DCNs) may exist as candidates to communicate with CIoT devices. One study has proposed having an eNB select from among the DCNs based on a "UE usage type" parameter that is passed to the eNB from a UE. This study is discussed in SA WG2 documents S2-152388 and S2-152710 and in 3GPP TR 23.720 v0.1.0.

SUMMARY

The present disclosure is concerned with facilitating selection of a serving node. A serving node (SN), such as a MME or a SGSN, may be a node in a core network that performs mobility management and session management for a WCD (e.g., a UE). The serving node and WCD may communicate using a WCD-SN protocol, which is a protocol used by the SN to support the mobility management and session management functionality. One such protocol is the Non-Access Stratum (NAS) protocol, which has been used to perform mobility management and session management for mobile phones. This NAS-based management for mobile phones, however, may be excessive for IoT devices such as a sensor, which may be much simpler in design, have much more limited data traffic requirements, and/or used in applications that involve much less mobility. The NAS protocol may thus have multiple versions (or variants or subsets), with one version, variant, or subset used to manage, e.g., mobile phones and one version, variant, or subset used to manage, e.g., an IoT device such as a sensor. While a serving node may support all versions, variants, or subsets of the NAS protocol, this may increase the cost of implementing the serving node. Thus, some serving nodes may support only one (or some other subset) of the versions, variants, or subsets of the NAS protocol, and may be incompatible with other versions (or variants or subsets). While this can simplify the implementation of a serving node (SN), this simplified implementation may lead to communication error between a WCD and a SN that are using versions of the NAS protocol that are incompatible with each other. To avoid this problem, the WCD may thus provide a "NAS type" parameter value to a base station to indicate what version, variant, or subset of the NAS protocol the WCD is using. The base station may then select a serving node (SN) that is compatible with the NAS type being used by the WCD. The base station's selection may also take into account a device type and/or load balancing considerations. The base station may then communicate with the selected serving node to facilitate attachment of the WCD to that serving node.

In some instances, the base station may receive the WCD's UE usage type (more generally the WCD usage type), but not use that information in selecting a serving node. The base station may instead simply forward the UE usage type to the selected serving node. The selected serving node may use the UE usage type in determining whether to re-route the WCD to a serving node of a different Core Network. The selected serving node may leverage other information stored in databases in the serving node's core network to make that determination. This arrangement would also keep such selection function and all related information in just one place, i.e. the serving node, and avoiding any duplication of the selection function to also RAN nodes.

Accordingly, one aspect of the present application relates to a method, apparatus, and system for establishing communication between a wireless communication device (WCD) and one of a plurality of serving nodes (SNs) grouped into different types of Core Networks where the SNs are each in communication with a base station and that are each configured to perform mobility management for WCDs and to perform session management between WCDs and a core network (CN). In an embodiment, the method includes the WCD determining information that identifies which WCD-SN protocol type, from among a plurality of WCD-SN protocol types, is supported by the WCD or is being used by the WCD. The method further includes the WCD transmitting, to a base station controller, a message that includes the information that identifies which WCD-SN protocol type is supported by the WCD or is being used by the WCD.

Each of the WCD-SN protocol types may be a variant, subset or version of a protocol used by one of the SNs to support mobility management of WCDs and to support session management between the WCD and the SN's core network (CN). The identified WCD-SN protocol type may be compatible with one or more of the plurality of serving nodes and may be incompatible with another one or more of the plurality of serving nodes.

In some cases, the WCD determines a device type of the WCD that identifies capabilities of the WCD, and transmits the device type of the WCD in the message sent to the base station controller.

In some cases, each of the WCD-SN protocol type is a non-access stratum (NAS) type, the base station controller is an eNB, the serving node is a MME, the WCD is a UE, and the message sent to the base station controller includes a network attach message or a tracking area update message.

In some cases, the WCD receives, from one of the SNs, selection assistance information which indicates that the WCD will or has communicatively attached to a Core Network of a specific type, or that the WCD will or has communicatively attached to a different SN that was determined to be compatible with the identified WCD-SN protocol type.

Another aspect of the present application relates to a method, apparatus, and system for a base station controller to facilitate communication between a wireless communication device (WCD) and one of a plurality of serving nodes (SNs) that are each in communication with a base station, where the SNs are each configured to perform mobility management for WCDs and to perform session management between WCDs and a core network (CN). In an embodiment, the method includes a base station controller of the base station receiving, from the WCD, a message that includes information identifying which WCD-SN protocol type, from among a plurality of WCD-SN protocol types, is supported by the WCD or is being used by the WCD. The base station controller selects, based on the identified WCD-SN protocol type, one of the plurality of SNs, wherein the selected SN is from a first set of one or more SNs. The base station controller transmits, to the selected SN, a request for the WCD to communicatively attach with selected SN.

Each of the WCD-SN protocol types is a variant, subset or version of a protocol used by one of the SNs to support mobility management of WCDs and to support session management between WCDs and the SN's core network (CN). The identified WCD-SN protocol type is compatible with the first set of one or more of the plurality of SNs and is not compatible with a second set of another one or more of the plurality of SNs.

Another aspect of the present application involves a method, apparatus, and system for establishing communication between a wireless communication device (WCD) and one of a plurality of serving nodes (SNs) that are each in communication with a base station and that are each configured to perform mobility management for WCDs and to perform session management between WCDs and a core network (CN). In an embodiment, the method includes the SN receiving, from a base station, a message that requests communicative attachment between the WCD and the SN, wherein the message identifies a first WCD usage type of the WCD, wherein the first WCD usage type identifies data traffic characteristics to be expected from the WCD. The SN obtains, from a subscriber database in the SN's CN, a second WCD usage type of the WCD. The second WCD usage type identifies data traffic characteristics to be expected from the WCD. The SN determines, based on the first WCD usage type and the second WCD usage type, whether to re-route the WCD to another one of the SNs. The WCD is using or supports one of a plurality of versions, variants, or subsets of a WCD-SN protocol that is used by the SN to support mobility management of the WCDs and to support session management between the WCDs and the SN's core network (CN). The SN and the another SN are compatible with the version, variant, or subset of the protocol being used or supported by the WCD, and are not compatible with one or more other versions, variants, or subsets of the protocol.

In this embodiment, in response to determining not to re-route the WCD, the SN transmitting, to the WCD via the base station, an indication that the WCD is or will be communicatively attached to the SN. In response to determining to re-route the WCD, the SN transmits, to the WCD via the base station, an indication that the WCD is to be re-routed to the another SN.

These and other aspects and embodiments are further described herein.

BRIEF DESCRIPTION OF THE DRAWINGS

FIGS. 3A and 3B illustrate example data structures used by a base station to select from among a plurality of serving nodes.

DETAILED DESCRIPTION

Figure 1:
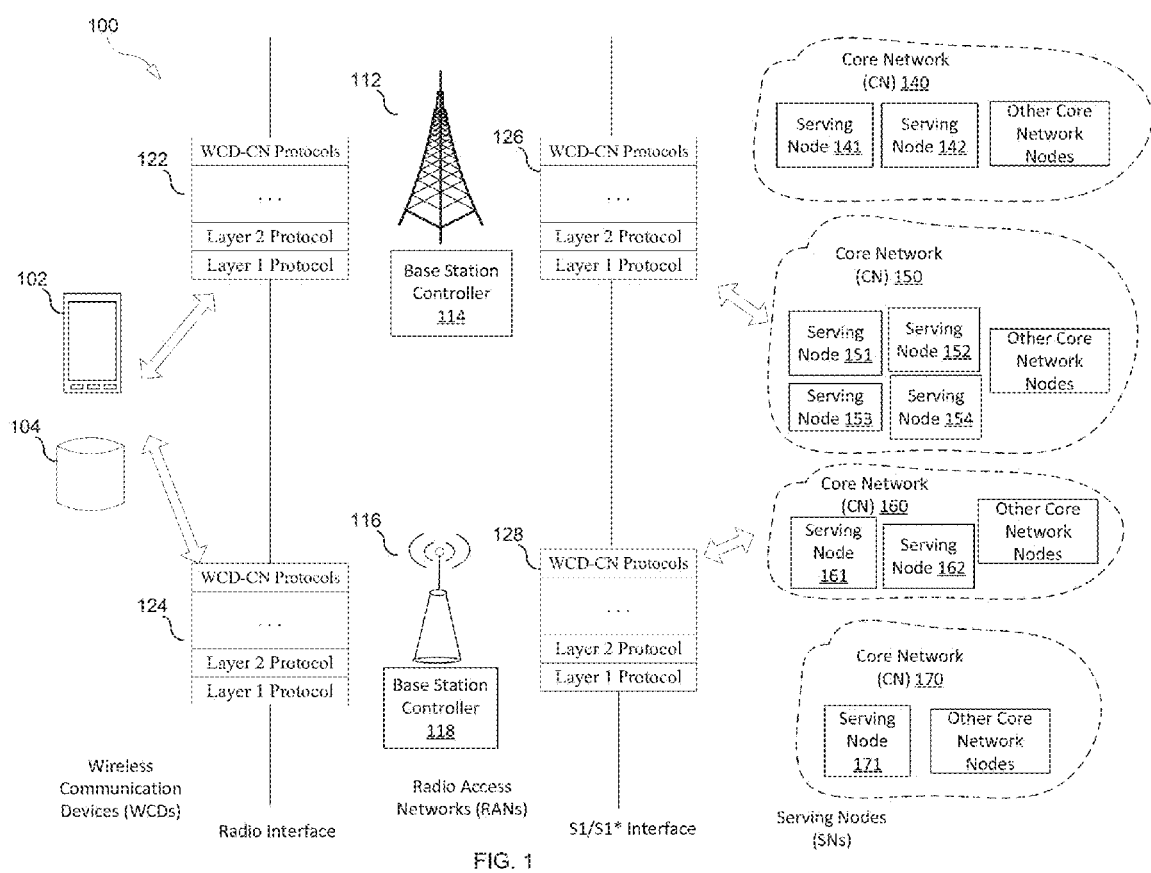
FIG. 1 illustrates an example system in which a base station selects from among a plurality of serving nodes based on a WCD-SN protocol type.

FIG. 1 illustrates an example system 100 for providing a wireless communication device (WCD) with network connectivity, such as to the Internet or a private enterprise network or a CIoT cloud network. This connectivity is provided in part by one or more core networks, such as those of a service provider's PLMN. Each core network includes a serving node, such as MME 241. The WCDs in system 100 includes WCD 102, such as a UE, and WCD 104, such as an IoT device (e.g., a sensor embedded in a home appliance). System 100 may provide functionality for forming a cellular IoT (CIoT) network, which is discussed in TS 23.720 and TS 45.820.

The serving node (SN) may perform mobility management and session management for the WCD. Mobility management may include performing WCD location tracking, WCD paging, and other mobility management functions. Session management may include performing bearer activation/deactivation for a PDN connection for the WCD and IP address allocation for the PDN connection.

In some implementations, the SN's core network (CN) may be a dedicated core network (DCN) that is assigned to a specific group of subscribers or set of subscribers with special requirements on functions and network characteristics. DCNs are discussed in TS 23.401, TS 23.236, and TS 23.060, which may also be referred to as the DÉCOR standard.

System or PLMN 100 includes base stations 112 and 114. Each base station may form a radio access network (RAN) that provides access between a WCD and a serving node of a CN. Each base station may have a base station controller, such as base station controller 114 and base station controller 118. The RAN may be, e.g., UTRAN, E-UTRAN, or a RAN dedicated for Cellular Internet-of-Things e.g. with narrowband radios.

The serving nodes may be grouped together to support the same core network (140, 150, 160, 170) also known as Dedicated Core Network (DCN). Each DCN may serve UEs of specific UE Usage Types, i.e. UEs with special requirements on functions and network characteristics. Hence there may be different types of DCNs in a PLMN 100. Each type of a Core Network (i.e. DCN) may provide its own unique set of functions and specific network characteristics. In a mobile network a specific type of Core Network (e.g. DCN) that an operator has chosen to deploy, is typically present in all areas of that PLMN. For instance, serving nodes 141 and 142 may be grouped together as serving nodes supporting core network (CN) 140. Serving nodes 151, 152, 153, and 154 may be grouped together as serving nodes supporting CN 150. Serving nodes 161 and 162 may be grouped together as serving nodes supporting CN 160. A single serving node 171 may support CN 170. Together the different CNs (140, 150, 160, 170) form a pool. There may be one or multiple pools in a PLMN 100.

WCDs may communicate with base stations using a radio interface protocol stack, such as protocol stack 122 or protocol stack 124. The protocol stack may organize communicated data into different layers, such as Layer 1 (e.g., Physical Layer), Layer 2 (e.g., Medium Access Control (MAC) layer and Radio Link Control (RLC) layer), a WCD-SN layer (e.g., a Non-Access Stratum (NAS) layer), and other layers. In each layer, the data may be organized or formatted according to a protocol for that layer. For example, data in the WCD-SN layer may be organized according to the WCD-SN protocol, which may be a protocol used by the WCD and SN to communicate control signaling with each other. In some instances, protocol stack 122 may be the same as protocol stack 124.

Base stations may communicate with serving nodes using, e.g., a protocol stack 126 or protocol stack 128. In LTE systems, this may be referred to as a S1 interface protocol stack or S1* interface protocol stack. The S1 interface protocol stack may be used for, e.g., a general eNB, while the S1* interface protocol stack may be used for, e.g., a CIoT radio access network. The protocol stack may organize communicated data into different layers, such as Layer 1 (e.g., L1 layer), Layer 2 (e.g., L2 layer and Internet protocol (IP) layer), WCD-SN layer (e.g., a Non-Access Stratum (NAS) layer), and other layers. In each layer, data may be organized or formatted according to a protocol for that layer. For example, data in the WCD-SN layer may be organized according to the WCD-SN protocol. In some instances, protocol stack 126 may be the same as protocol stack 128.

Base station 112 or 114 may select which serving node will communicatively attach with a WCD. The attachment may include, for example, registration of the WCD with the serving node's CN and assignment of a communication bearer (e.g., an evolved packet service (EPS) bearer) to the WCD. As discussed below, the base stations may make the selection based on a "WCD-SN protocol type" parameter that is communicated from the WCD. In an embodiment, the WCD may further communicate a "Device type" parameter and a "WCD usage type" parameter to a particular base station. In some cases, the base station may make its selection of the serving node further based on the device type, without taking the WCD usage type into account. The WCD usage type parameter may not be visible to the base station. For instance, it may be stored as part of payload data that the base station simply relays to a serving node without further inspection. The WCD usage type is discussed in TS 23.401 and TS 23.720.

WCD 102 may be a UE, such as a cellular phone. WCD 104 may be a cellular Internet of Things (CIoT) device, such as a home appliance (e.g., a thermostat), a sensor (e.g., a sensor in a car), or medical device (e.g., a pulse rate monitor). A WCD such as a cellular phone may have very different data traffic characteristics than a WCD such as a CIoT device. For example, a CIoT WCD may send or receive much smaller message sizes (e.g., 20 bytes to 200 bytes), send or receive fewer packets (e.g., 1 to 2 packets per transmission/reception), and/or communicate much less frequently (e.g., only several times a day). Accordingly, as more serving nodes and core networks are deployed to service an increasing quantity of CIoT devices, building serving nodes that were designed to service mobile phone data traffic may be excessive and unnecessarily increase cost and/or control signaling. This cost and control signaling may be decreased by simplifying the implementation for providing a CIoT device with network access.

One way to simplify this implementation may be to create a simpler version (or simpler variant or a subset) of the WCD-SN protocol used to perform mobility management for the WCD and session management between the WCD and SN. The different versions (or variants or subsets) of the WCD-SN protocol may not, however, be compatible with all WCDs or with all SNs. For example, in LTE systems, a simpler version, variant, or subset of the Non-Access Stratum (NAS) protocol may be created. The NAS protocol is discussed in TS 24.301 and TS 24.008, which identifies various mandatory and optional parameters that are communicated between a WCD and a serving node to perform mobility management and session management. A first version, variant, or subset of the NAS protocol may be an original version, variant, or subset of the NAS protocol, requiring an original set of mandatory parameters, and may be used to service mobile phones. A second version, variant, or subset of the NAS protocol may convert some of the mandatory parameters in the first version, variant, or subset to optional parameters, and/or add some mandatory parameters which are not in the first version, variant, or subset, and may be used to service CIoT devices. The second version, variant, or subset of the NAS protocol may streamline communication between a SN and a CIoT device, but may not be backwards compatible with a mobile phone that is using the first version, variant, or subset of the NAS protocol. As described in more detail below, the WCD may provide a "NAS type" parameter value to a base station to indicate which version, variant, or subset of the NAS protocol it supports or is using, and the base station may select a SN based on the NAS type.

Figure 2:
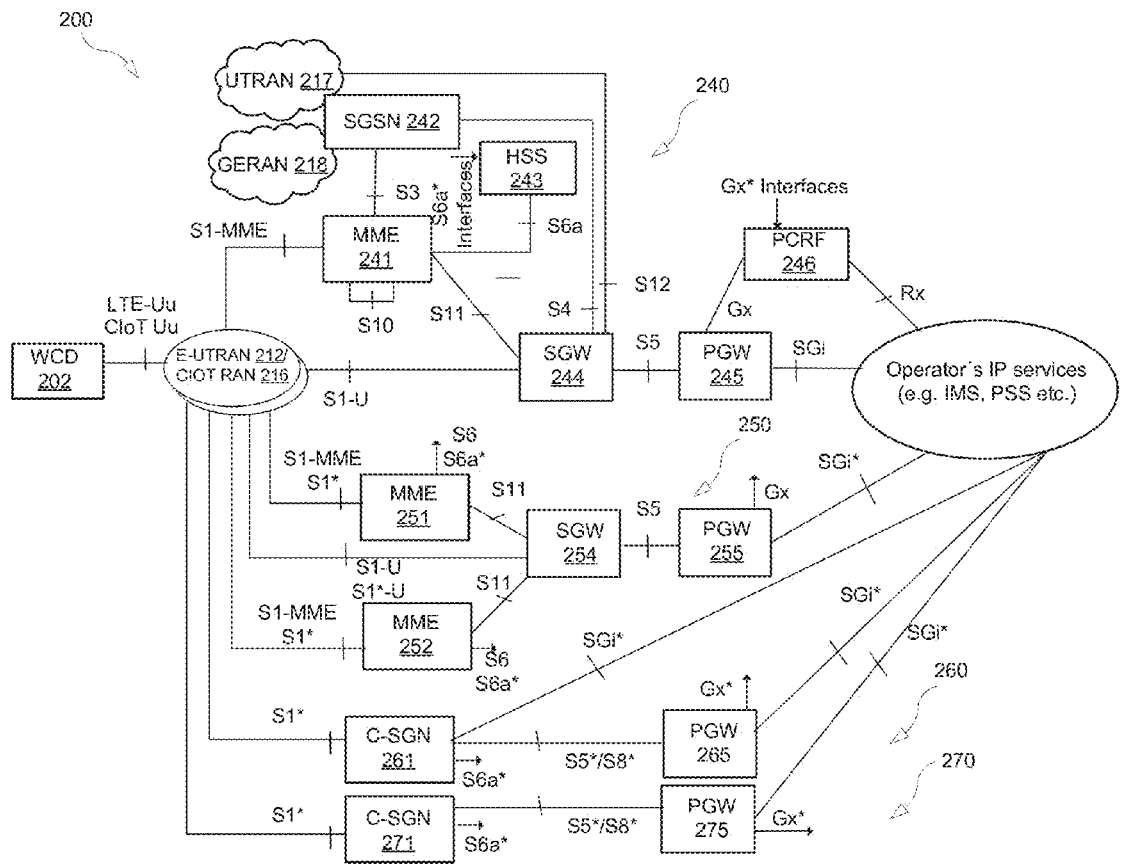
FIG. 2 illustrates an example system in which a base station selects from among a plurality of serving nodes based on a WCD-SN protocol type.

FIG. 2 illustrates an example LTE system 200 for facilitating selection of a serving node, which in this example is a Mobility Management Entity (MME), a CIoT Serving Gateway Node (C-SGN), or a Serving GPRS Support Node (SGSN). The serving nodes include MME 241 and SGSN 242 in a core network 240, MME 251 and 252 in a core network 250, C-SGN 261 in a core network 260, and C-SGN 271 in a core network 270. A WCD 202 (a UE or CIoT device) may attempt to communicate with any of the serving nodes via, e.g., a eNB in e-UTRAN 212 or a CIoT Base Station (C-BS) in a CIoT RAN 216. The core networks may have other core network nodes, such as a serving gateway (SGW) (e.g., SGWs 244, 254), and a PDN Gateway (e.g., PGWs 245, 255, 265, 275). In an embodiment, the different core networks 240, 250, 260, and 270 may share one Home Subscriber Server (HSS) 243 and one Policy Charging Rules Function (PCRF) node 246.

In one example, the LTE system 200 may provide several versions, variants, or subsets of the NAS protocol used by the serving nodes to perform mobility management and session management. For instance, a first version, variant, or subset may be for normal use by mobile phones and similar devices. A second version, variant, or subset may be for use by CIoT devices. MME 241 of CN 240 may, for example, support only the first version, variant, or subset of the NAS protocol. MME 251 and 252 of CN 250 may support only the second version, variant, or subset of the NAS protocol. MME 261 and 271 of CNs 260 and 270 may each support only the second version, variant, or subset of the NAS protocol.

The "NAS type" parameter shows which variant of the NAS protocol a WCD is using and/or supports. Example sets of possible NAS type parameter values include the set {CIoT NAS, "Normal"/"legacy"/"MBB" NAS} or {"TS24.008 NAS", "TS24.xxx NAS" }. Each variant of the NAS protocol may be thought of as a NAS "dialect" that is supported by some SNs, but not other SNs.

FIGS. 3A and 3B illustrate example values of the "NAS type" parameter. In these examples, the parameter may have a scalar value from 1 to 2. For example, a value of 1 may indicate an original or legacy version, variant, or subset of the NAS protocol that may be used for mobile broadband (MBB) applications. A value of 2 may indicate a version, variant, or subset of the NAS protocol that is adapted for CIoT devices. In an embodiment, additional versions, variants, or subsets of the NAS protocol may be available, and the "NAS type" parameter may have additional values, which correspond to those additional protocol versions, variants, or subsets.

In some implementations, a base station may store a table that is used to select a serving node based on a value of the NAS type parameter. Examples of such a table are illustrated in FIGS. 3A and 3B. Both figures show a table which indicates that a WCD which supports or uses a NAS type of 1 should be attached to MME 241; that a WCD which supports or uses a NAS type of 2 should be attached to C-SGN 261, C-SGN 271, MME 251, or MME 252. The base station may be able to update or otherwise modify the table to accommodate new versions, variants, or subsets to the NAS protocol, or to reflect changes in how the selection of serving nodes is to be made. FIG. 3B further includes information which may be used to map a value of the NAS type parameter to a core network (e.g., DCN 240, 250, 260, or 270). The selection of a serving node implicitly selects the core network in which the serving node is located. In some cases, as illustrated in FIG. 3B, the mapping may be explicit. For instance, a controller of the base station may have a circuit or code that uses the table in FIG. 3B to explicitly select a core network based on the NAS type. Such a scenario may assume that all serving nodes in the core network support the same NAS type or NAS types. If the core network has multiple serving nodes, the base station may then select one of the serving nodes based on a device type, load balancing consideration, or any other technique (e.g., a random selection). Thus, the selection of a serving node based on the NAS type may include a selection of the serving node's core network.

Figure 4:
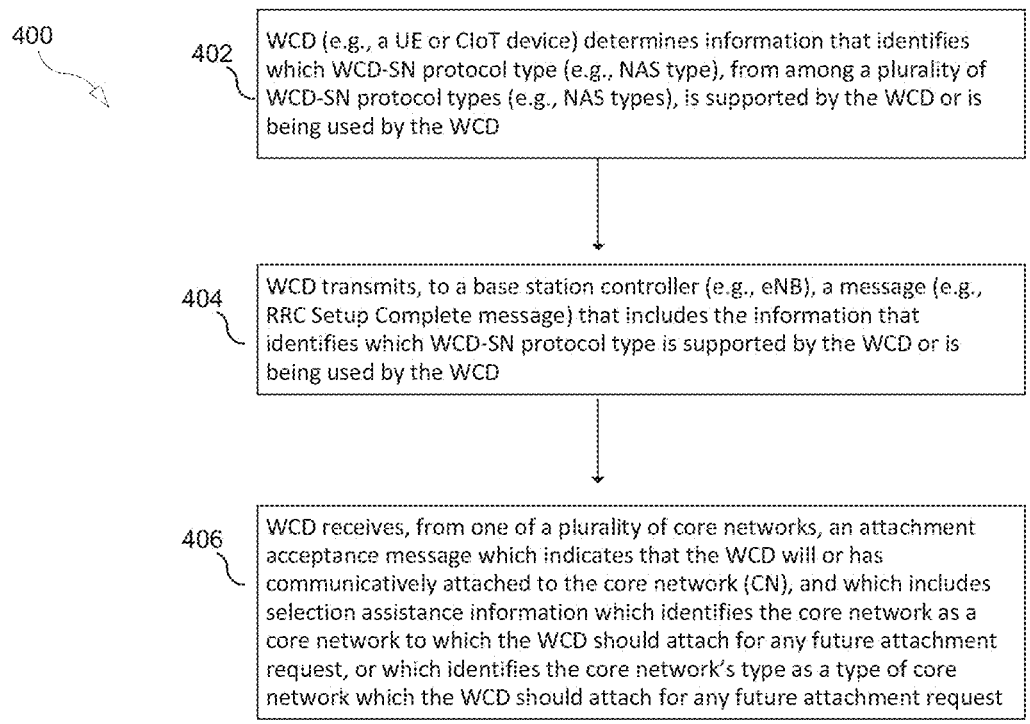
FIG. 4 illustrates a flow chart that shows example steps of a method in which a wireless communication device (WCD) facilitates establishment of communication between the WCD and one of a plurality of SNs that are each in communication with a base station.

FIG. 4 provides a flow diagram that illustrates an example process 400 for establishing communication between a wireless communication device (WCD) and one of a plurality of serving nodes (SNs). The plurality of SNs (e.g., MMEs) may each be in communication with a base station (e.g., a eNB of e-UTRAN 212). Each of the SNs may be configured to perform mobility management for WCDs and to perform session management between WCDs and a core network, such as a core network to which the SN belongs. The example process 400 may be performed by a WCD, such as WCD 202. In an embodiment, process 400 begins at step 402, in which WCD 202 (e.g., a UE or CIoT device) determines information that identifies which WCD-SN protocol type, from among a plurality of WCD-SN protocol types, is supported by the WCD 202 or is being used by the WCD 202. Each of the WCD-SN protocol types may be a variant, subset or version of a protocol used by one of the SNs (e.g., MME 241, MME 251, MME 252, C-SGN 261, or C-SGN 271) to support mobility management of WCDs and to support session management between WCDs and the SN's CN. For example, the WCD-SN protocol may be a NAS protocol, and the WCD-SN protocol type may identify which NAS type, from among a plurality of NAS types, is supported by the WCD or is being used by the WCD. The identified WCD-SN protocol may be compatible with one or more of the plurality of SNs, and not compatible with another one or more of the plurality of SNs.

In step 404, the WCD 202 transmits, to a base station controller (e.g., a eNB or RNC) a message that includes the information that identifies which WCD-SN protocol type is supported by the WCD 202 or is being used by the WCD 202. The information that identifies the WCD-SN protocol type may, for example, be stored on a subscriber identity module (SIM), universal subscriber identity module (USIM), or universal integrated circuit card (UICC) in the WCD. The information may take the form of, e.g., a scalar value, such as an integer number, that corresponds to different WCD-SN protocol types (e.g., 1=normal/legacy/MBB version, variant, or subset of NAS protocol; 2=CIoT version, variant, or subset of NAS protocol). The identified WCD-SN protocol type may, for example, correspond to a protocol version, variant, or subset (e.g., CIoT version) which has a different set of mandatory parameters compared to a protocol version (or variant or subset) corresponding to another WCD-SN protocol type (e.g., traditional or original version, variant, or subset). The mandatory parameters for one version, variant, or subset of the protocol may, for instance, include a subset of the mandatory parameters of another version, variant, or subset of the protocol, as well as one or more additional parameters not found in the latter version, variant, or subset.

In an embodiment, the message (e.g., a RRC message) includes a network attach message (e.g., a NAS Initial Attach message) or a tracking area update (TAU) message. In an embodiment, the message includes a service request message.

In step 406, the WCD may receive, from one of the plurality of SNs, an attachment acceptance message which indicates that the WCD will or has communicatively attached to the core network (CN), and which includes selection assistance information which identifies the core network as a core network (140, 150, 160, 170) to which the WCD should attach for any future attachment request, or which identifies the core network's type as a type of core network which the WCD should attach for any future attachment request. If the WCD loses attachment to, e.g., the core networks of a PLMN and subsequently initiates another attachment process, it may supply the selection assistance information to the base station, which may use this information to avoid picking a SN that triggers re-routing.

In some instances, the WCD determines a device type of the WCD. The device type may identify capabilities of the WCD. As an example, the device type may indicate a LTE category of the WCD. A LTE category of 1 through 10 may be mapped to one set of SNs, while a LTE category of 0 may be mapped to another set of SNs. In some instances, the WCD may have a device type value of "NB", for Narrowband devices. The WCD may transmit the device type to the base station controller in the same message.

Figure 5:
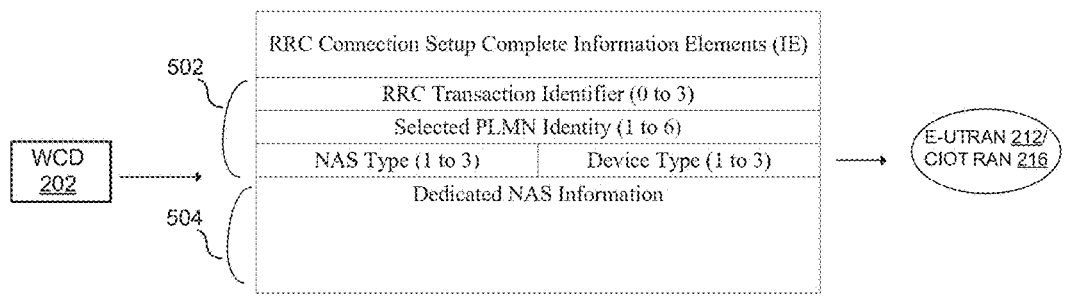
FIG. 5 illustrates an example structure of a RRC Connection Setup Complete message transmitted by a WCD to a base station.

In some implementations, the transmitted message is a radio resource control (RRC) message, such as a RRC Connection Setup Complete message. FIG. 5 illustrates an example of a RRC Connection Setup Complete message Information Element (IE), which shows at least a portion of the structure of the message. The message may include a parameter portion 502, which includes parameter values to be communicated to a base station controller, and a payload portion 504, which includes payload data that is to be forwarded by the base station controller to a serving node. In some implementations, the base station controller will not parse or otherwise inspect the payload data. The WCD (e.g., WCD 202) may transmit in the RRC message the WCD-SN protocol type, the WCD device type, and a WCD usage type determined by the WCD. The WCD usage type may indicate data traffic characteristics to be expected from the WCD. One example of this parameter, the UE usage type, is described in TS 23.401. The WCD-SN protocol type and WCD device type may be transmitted in the parameter portion 502, whereas the WCD usage type may be transmitted in the payload portion 504.

In such scenarios, specific parameter values (e.g., a WCD usage type) may be placed in the payload portion 504 of the RRC message so that they are not "visible" to the base station controller, while specific parameter values (e.g., NAS type and Device type) may be included in the parameter portion 502 so that they are "visible" to the base station controller. This arrangement may allow parameter values such as the NAS type and Device type to be used by the base station controller in selecting a SN, while other parameter values such as the WCD usage type is not used by the base station controller, because the WCD usage type may be better leveraged by the selected SN instead.

As described in more detail below, a selected SN may re-route the WCD to a different SN. Re-routing of WCDs is described in TS 23.401 v13.3.0 clauses 4.3.24 and 5.19. The SN selected by the base station may decide that the WCD should be communicatively attached to a different Core Network or different SN. To reduce the need for future re-routings at initial attachments the new SN may convey information about the final type of Core Network (140, 150, 160, 170) the WCD was attached to. Types of the core network may include, e.g., a mobile broadband (MBB) CN and a CIoT CN. This information can in the future life of the WCD be used to better inform a base station of the same PLMN which type of Core Network (140, 150, 160, 170) that is compatible with the identified WCD-SN protocol type and shall be selected for the WCD to avoid re-routings. Thus, returning to FIG. 4, the WCD 202 may receive selection assistance information in step 404 to indicate which type of Core Network (140, 150, 160, 170) that the WCD will or has communicatively attached to that is compatible with the identified WCD-SN protocol type. The WCD 202 may receive this information from one of the SNs, such as the SN to which the WCD is re-routed to, or even the original SN selected by the base station controller. If no re-routing occurs, the selected SN may still transmit selection assistance information to indicate that the WCD will communicatively attach or has communicatively attached to the selected Core Network (140, 150, 160, 170).

Figure 6:
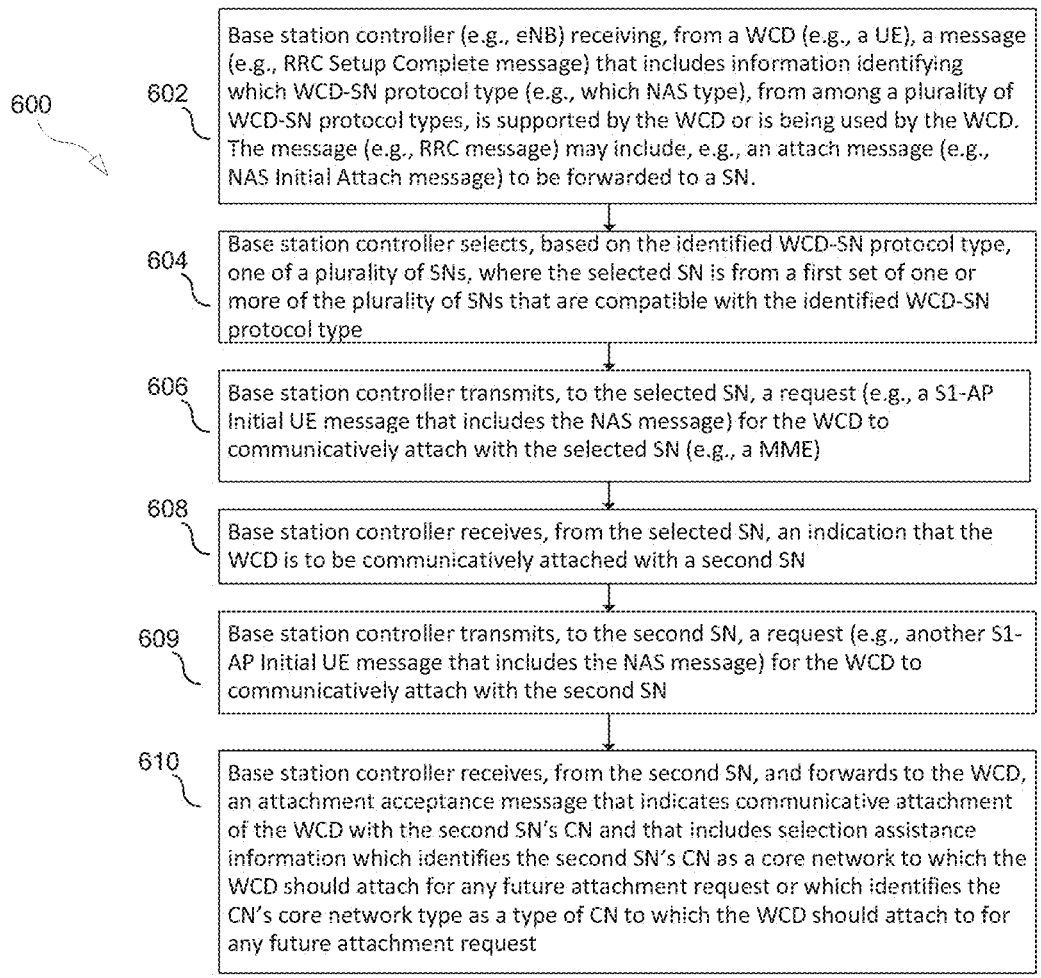
FIG. 6 illustrates a flow chart that shows example steps of a method in which a base station facilitates communication between a WCD and one of a plurality of SNs that are each in communication with a base station.

FIG. 6 illustrates an example method 600, from a perspective of a base station controller, for facilitating communication between a WCD and one of a plurality of SNs that are each in communication with a base station and that are each configured to perform mobility management for WCDs and to perform session management between a CN and WCDs. The steps in method 600 may be performed by a controller of the base station, such as a controller in an eNB or a RNC. In an embodiment, method 600 may begin with step 602, in which a base station controller of the base station receives, from the WCD, a message that includes information identifying which WCD-SN protocol type, from among a plurality of WCD-SN protocol types, is supported by the WCD or is being used by the WCD. As discussed above, each of the WCD-SN protocol types is a variant, subset or version of a protocol used by one of the SNs to support mobility management of WCDs and to support session management between WCDs and the SN's core network (CN), and the identified WCD-SN protocol type is compatible with a first set of one or more of the plurality of SNs and is not compatible with a second set of another one or more of the plurality of SNs. In an embodiment, the message is a RRC message which includes parameters for the base station and includes a payload which has a NAS message to be forwarded by the base station to the SN.

In step 604, the base station controller may select, based on the identified WCD-SN protocol type, one of the plurality of SNs, wherein the selected SN is from the first set of one or more SNs. For example, the selection may be based on a table like that illustrated in FIG. 3A or FIG. 3B, which may be stored at the base station. A particular WCD-SN protocol type may, for instance, map to a first set that has only one SN, or may map to a first set that has multiple SNs. If the first set has multiple SNs, the base station controller may randomly select from among the first set of multiple SNs, or use a round robin selection scheme, or use any other selection scheme. The selection of a SN is an implicit selection of a CN to which the SN belongs. In an embodiment, the selection may be explicit. For example, the base station controller in step 604 may explicitly identify a CN (e.g., CN 250) that has serving nodes which support the WCD-SN protocol type. If multiple CNs meet that criteria, the base station controller may select from among the multiple CNs randomly, or based on a WCD's device type, or a load balancing consideration, or any other technique. If the identified CN has multiple serving nodes, the base station controller may select from among the serving nodes, again doing so randomly, or based on the WCD's device type, or a load balancing consideration, or any other technique.

In step 606, the base station controller may transmit, to the selected SN, a request for the WCD to communicatively attach with the selected SN.

Figure 7:
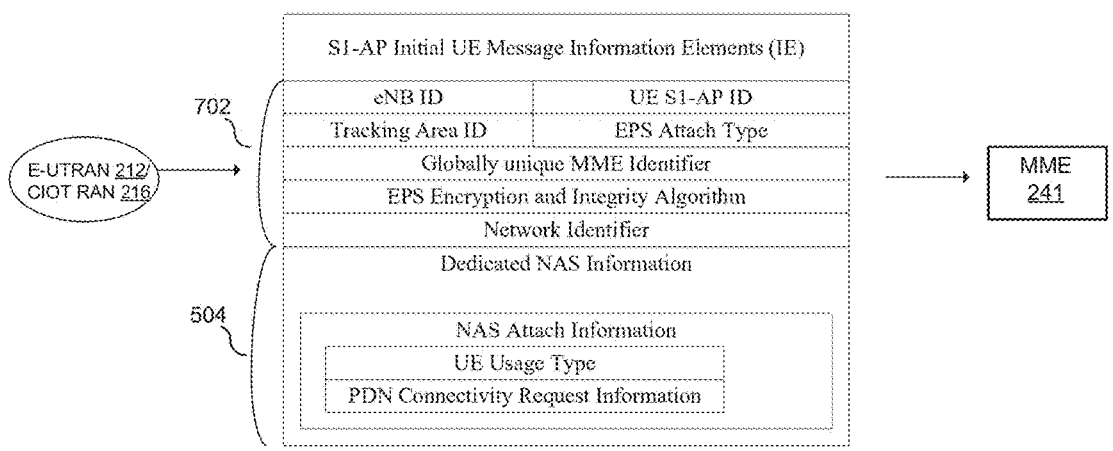
FIG. 7 illustrates an example structure of a S1-AP Initial UE message transmitted by a base station to a SN.

In an embodiment, the request may be in the form of a S1-AP Initial UE message, which may include a NAS message being a network attach message or a TAU message. FIG. 7 illustrates a structure of the S1-AP Initial UE message, which may include the payload portion 504 from the RRC message shown in FIG. 5. In one example, the base station controller may receive a RRC message that has a parameter portion 702 which includes the WCD-SN protocol type and the WCD's device type. The received RRC message may also include the payload portion 504. In some instances, the payload portion 504 may include a network attach message (e.g., a NAS Initial Attach message), which may contain a WCD usage type that indicates traffic characteristics to be expected from the WCD. In some instances, the payload portion 504 may include a TAU message. Information may be placed in the payload portion so that it is not "visible" to the base station controller. Thus, the base station controller may select one of the SNs based on the WCD-SN protocol type and/or WCD's device type, but not based on the WCD usage type in the payload portion of the RRC message. The payload portion may merely be transmitted by the base station controller to the selected SN as part of the request for the WCD to communicatively attach with the selected SN. For instance, the RRC message received by the base station may include a payload portion that has a network attach message which identifies a UE usage type. The base station controller may generate a request, such as a S1-AP Initial UE message used in LTE, that includes the payload portion (i.e., that includes the network attach message and the UE usage type). The request is then sent to a MME or other SN.

In some instances, the selected SN may re-route the WCD to another SN that supports the identified WCD-SN protocol type. The selected SN, or the SN to which the WCD is re-routed, may convey this re-routing, in the form of S1AP Reroute message, to the base station controller, which may relay the re-routed NAS message to the new SN selected by the first SN. Thus, returning to FIG. 6, in an embodiment the selected SN may be a first SN in a set of SN's that are compatible with the identified WCD-SN protocol type. The set may further include a second SN. The method 600 may include a step 608 in which the base station controller receives, from the selected SN, an indication that the WCD is to be communicatively attached with the second SN. In step 609, the base station controller may, for example, transmit a request (e.g., another S1-AP Initial UE message that includes the NAS message) to the second SN for the WCD to be communicatively attached with the second SN. If this request is successful, the base station controller may, in step 610, receive from the second SN and forward to the WCD, an attachment acceptance message (e.g., a NAS acceptance message) that indicates communicative attachment of the WCD with the second SN's CN and that includes selection assistance message which identifies the second SN's CN as a core network to which the WCD should attach for any future attachment request or which identifies the CN's core network type as a type of CN to which the WCD should attach to for any future attachment request.

Figure 8:
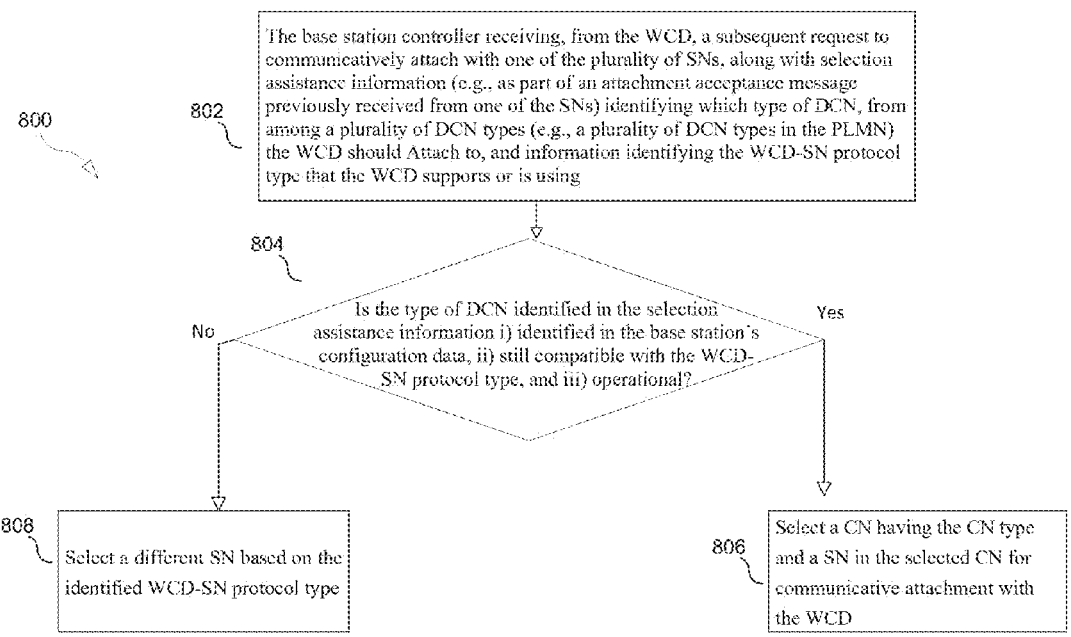
FIG. 8 illustrates a flow chart that shows example steps of a method in which a base station facilitates communication between a WCD and one of a plurality of SNs that are each in communication with a base station.

Thus, if the WCD loses the communicative attachment (e.g., it moves to a different service provider's PLMN) and at a subsequent occasion contacts a base station within this original PLMN to request attachment again to a SN, the WCD may supply the base station with information from the selection assistance message. Thus, turning to FIG. 8, in an example method 800 for a subsequent selection of a SN, the base station controller may receive in step 802, from the WCD, a subsequent request to communicatively attach with one of a plurality of SNs. This subsequent request may further include information identifying the WCD-SN protocol type supported or being used by the WCD, and selection assistance information that indicates what type of Core Network the WCD should attempt to attach to in this specific PLMN, such as a previous request associated with step 602. This selection assistance information may have been received by the WCD as part of an attachment acceptance message previously received by one of the SNs as part of a previous attachment process.

In step 804, the base station controller may determine whether the type of CN identified in the selection assistance information is i) identified in the base station's configuration data, ii) still compatible with the WCD-SN protocol type, and iii) operational. These factors may arise, for example, if a network operator changes or removes a SN. It may, for example, remove a CN and the CN's nodes from the operator's PLMN (e.g., as part of network restructuring), which may lead to that a CN of that type and hence no SNs of that CN type no longer being identified in the base station's configuration data. The network operator may also change SNs corresponding to a CN type, such that they stops being compatible with a particular WCD-SN protocol type. The base station controller may thus still check whether the identified type of CN is compatible with the WCD-SN protocol type. In other embodiments, the base station controller may simply assume that the WCD-SN protocol type is still compatible with the SN. The base station controller may further determine whether the SN is operational, which may include, for example, determining whether the identified SN has been shut down, or whether it still exists. For example, in the time period after a WCD ends the attachment with a particular SN's core network (CN), a network operator may have shut down the CN temporarily or permanently.

In response to determining that the SN meets the above criteria, the base station may, in step 806, select a CN having the CN type and a SN in the selected CN for communicative attachment with the WCD. In response to determining that the SN does not meet the above criteria, the base station may, in step 808, select a different SN based on an identified WCD-SN protocol type.

Figure 9:
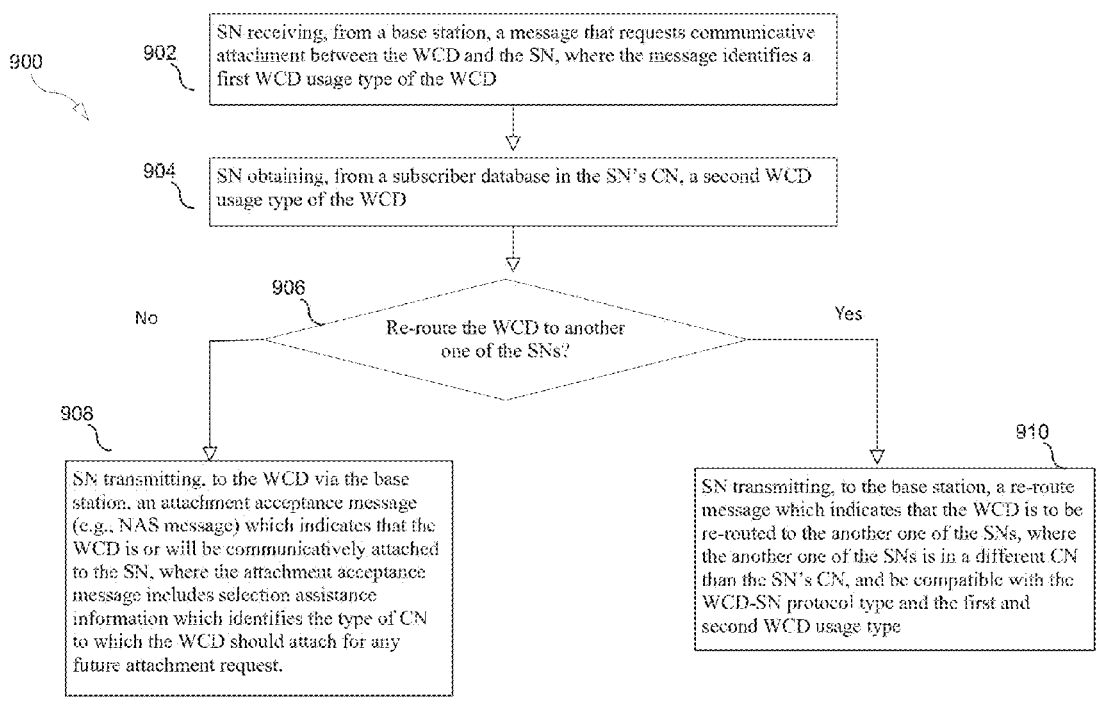
FIG. 9 illustrates a flow chart that shows example steps of a method in which a SN establishes communication with a WCD.

FIG. 9 illustrates a method 900 for establishing communication between a wireless communication device (WCD) and one of a plurality of serving nodes (SN), and is discussed from a perspective of one of the SNs (e.g., MME 251 or C-SGN 261). Each of the SNs may be in communication with a base station and may each be configured to perform mobility management for WCDs and to perform session management between WCDs and a core network. In an embodiment, the method begins at step 902, in which the SN receives, from a base station, a message that requests communicative attachment between the WCD and the SN. The message may identify a first WCD usage type of the WCD, where the first WCD usage type identifies data traffic characteristics to be expected from the WCD. As an example, the message may be a S1-AP Initial UE message that includes a payload having dedicated NAS information. This payload may include a first UE type.

In step 904, the SN may obtain, from a subscriber database (e.g., HSS 243) in the SN's CN, a second WCD usage type of the WCD, wherein the second WCD usage type identifies data traffic characteristics to be expected from the WCD. The first WCD usage type and the second WCD usage type may have the same value, or may have different values. Their values may be different in instances where, for instance, the network operator has changed a classification or description of data characteristics to be expected from the WCD, and has stored this change in the core network database, but this change has not yet been conveyed to the WCD.

In step 906, the SN may determine, based on the first WCD usage type and the second WCD usage type, whether to re-route the WCD to another one of the SNs. This determination may be based on ensuring the WCD connects to a SN of the correct type of CN, or load balancing considerations (e.g., whether the re-routing will improve load balance among the SNs), and/or on information from the subscriber database, such as information on the WCD's device capabilities, service level agreement (SLA) information for the WCD, and any other subscription information of the WCD. If there is re-routing to another SN, the another SN is compatible with the WCD's WCD-SN protocol type. That is, the SN and the another SN are both compatible with the version, variant, or subset of the WCD-SN protocol being used or supported by the WCD. In some instances, the SN and/or base station controller may check whether the other SN involved in the re-routing is compatible with the WCD's protocol type.

In some instances, the SN in step 906 may re-route a WCD to a different CN. For instance, if the SN is MME 251 of CN 250, it may re-route the WCD to only serving nodes that are not in CN 250. Re-routing among core networks is discussed in TS 23.401, TS 23.060, and TS 23.236.

In response to determining not to re-route the WCD, the SN may transmit in step 908, to the WCD via the base station, an attachment acceptance message (e.g., NAS message) which indicates that the WCD is or will be communicatively attached to the SN (i.e., indicates communicative attachment to the SN), where the attachment acceptance message includes selection assistance information which identifies the type of CN to which the WCD should attach for any future attachment request.

In response to determining to re-route the WCD, the SN may transmit in step 910, to the base station, a re-route message which indicates that the WCD is to be re-routed to another of the SNs. The another one of the SNs may have to be in a different CN than the SN's CN, and be compatible with the WCD-SN protocol type and the first and second WCD usage types.

Figure 10:
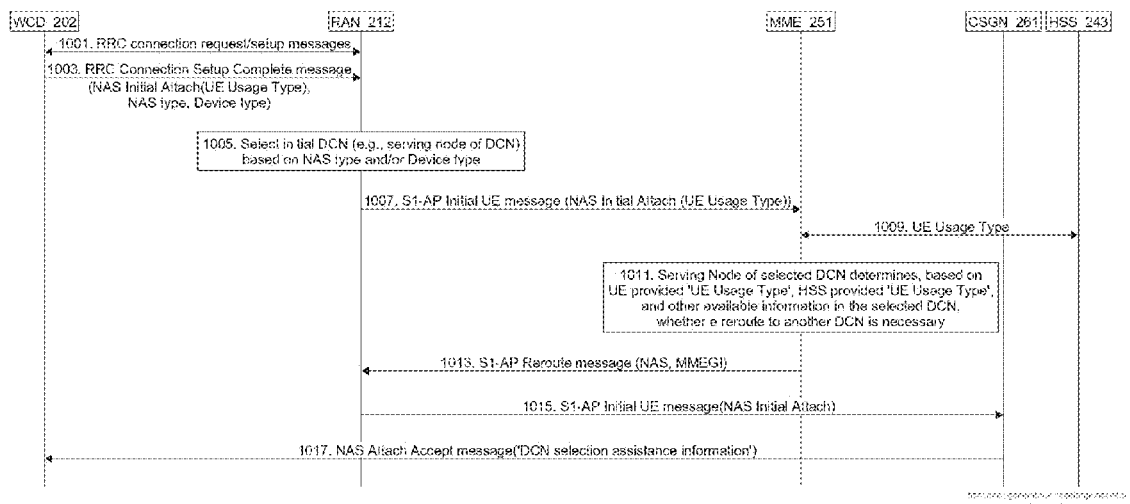
FIGS. 10-11 illustrate signaling diagrams that show a base station of a radio access network (RAN) selecting from among a plurality of SNs to facilitate communication between a WCD and the selected SN.
Figure 11:
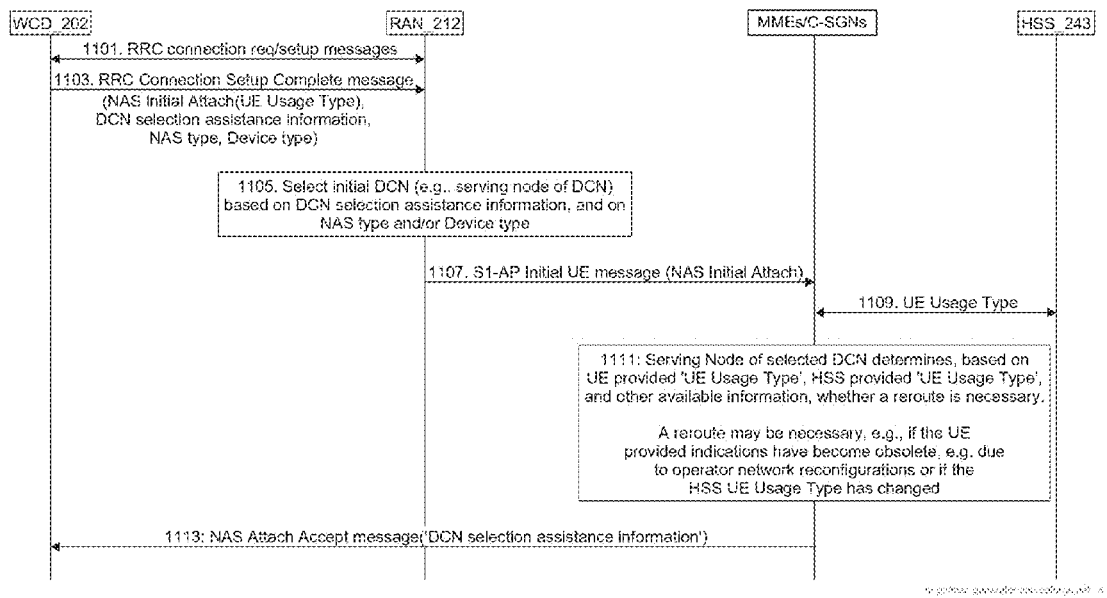

FIGS. 10 and 11 illustrate signal diagrams that show the selection of a SN in a LTE system. The timing diagram in FIG. 10 reflects an initial selection by a WCD 202, such as a UE or CIoT, that has never before attached to a particular operator's network, such as a PLMN. The PLMN may include multiple core networks of different types, which may each have one or more serving nodes. In this example, each of the core networks is a dedicated core network (DCN), each of which may be assigned to a specific subscriber or specific set of subscribers.

At step 1001, WCD 202 may exchange RRC connection setup messages with a base station controller of RAN 212. Once the RRC connection is established, the WCD 202 sends an initial message, such as RRC Connection Setup Complete message, to the RAN controller (e.g. eNB of a LTE system or a RNC for UMTS systems) in step 1003. The RRC message may include a NAS Initial Attach message or a tracking area update (TAU) message. The NAS Initial Attach message may include a NAS protocol description unit (PDU), which may include a Default WCD Usage Type value (e.g., a Default UE Usage Type). The WCD 202 provides a 'NAS type' which indicates which NAS version or variant or subset or "dialect" the NAS PDU is based on. The versions or variants may include, e.g., normal/EPC NAS, and simplified CIoT NAS. WCD 202 may also provide its 'Device type,' which indicates the WCD's capabilities. Examples values of 'Device type' include, e.g., 'CAT-0', 'NB', 'CAT-1', 'CAT-2', etc.

In step 1005, the controller of RAN 212 selects a serving node of a DCN, such as MME 251 of DCN 250, based on the WCD-identified 'NAS type' and preferably also based on the 'Device type.' The selection may also be based on the configuration in the RAN controller. In one example, the WCD 202 is a CIoT device using a CIoT version or variant of the NAS protocol, and the only DCN compatible with this protocol type is a single CIoT DCN. In such an example, the controller picks a serving node in the CIoT DCN. Other deployments may have, e.g., a mix of multiple CIoT DCNs that are compatible with just the CIoT NAS type and multiple normal/EPC DCNs that are compatible with just the normal EPC NAS type. The WCD-indicated 'NAS type' ensures the NAS PDU with the initial network attach message (e.g. Initial Attach) will be forwarded to a EPC DCN or CIoT DCN, and more specifically to a MME or CIoT Serving Gateway (C-SGN) of the DCNs, that understands the specific NAS "dialect" that the WCD is using. The controller of RAN 212 may also consider the device type in the selection process. For instance, one specific MME or C-SGN may be selected for all CAT-0 devices using a particular NAS type, and another specific MME or C-SGN may be selected for all NB devices using the NAS type. If multiple MMEs map to a particular combination of NAS type and Device type, the RAN may select among the MMEs based on, for example, load balancing processes specified in the DECOR specification.

In step 1007, the RAN controller sends the NAS Initial Attach message comprising the NAS PDU to the selected serving node, e.g. MME 251. The NAS Initial Attach message may include the Default WCD Usage Type received from the WCD 202 in step 1003.

In step 1009, MME 251 may retrieve a WCD Usage Type for WCD 202 from HSS 243 or a similar database, such as according to DÉCOR (Dedicated Core Networks) specifications, TS 23.401 v13.3.0 clauses 4.3.24 and 5.19 (for LTE) and in TS 23.236 and TS 23.060 (for UMTS).

In step 1011, MME 251 examines the WCD Usage Type provided by the WCD 202 and the WCD Usage Type provided by HSS 243, and may take other information available in its core network (DCN 250) into consideration (e.g. device capabilities, SLA information, other subscription information), to verify that MME 251's core network is suitable for WCD 202. This verification may be done according to the existing DÉCOR specification. The attach procedure started by the NAS Initial Attach message continues if the core network 250 is deemed suitable. If MME 251 deems that another core network should have been selected, MME invokes a reroute procedure, according to the DÉCOR specifications. If, however, only a single MME or C-SGN supports a particular NAS type, re-routing may be unnecessary or not possible. Similarly, if all the MMEs or C-SGNs that support a NAS type belong to the same DCN, re-routing may be deemed unnecessary, because the SN may prefer to not re-route to another SN in the same CN. In other words, the SN may prefer to re-route to a different CN, but this may not be possible if SNs in the other CNs do not support the NAS type.

MME 251 may thus cause a different serving node (e.g., C-SGN 261) that supports the same NAS "dialect" to be used for the initial attachment of WCD 202 to the PLMN. For example, in step 1013, MME 251 may transmit a S1-AP Reroute message to the base station controller of RAN 212. The message may identify C-SGN 261 (e.g., in a MMEGI and MMEI parameter). Either MME 251 (if there is no re-routing) or C-SGN 261 (if there is re-routing) may then continue the network attach procedure (in step 1015), attach details of which are described in TS 23.401 step 2 in FIG. 5.3.2.1-1 and onwards and steps 17 & 18 in FIG. 5.3.2.1-1.

In some embodiments, the MMEGI parameter may alternatively be some other type of "C-SGN group identifier."

In step 1017, the serving node that accepted the attachment request (e.g., MME 251 or C-SGN 261) may provide to WCD 202 'DCN selection assistance' information in a NAS Accept message. This information may indicate which type of CN (e.g., CN 250 or CN 260) the WCD is attached to or going to be attached to, and may in some cases indicate which SN in that CN (e.g., SN 251 or SN 261) is attached or going to be attached. WCD 202 may store the selection assistance information for each PLMN it has attached to, and provide the information in future messages such as network initial attach messages and TAU messages that are passed to the base station of a PLMN. Doing so may facilitate SN selection while avoiding re-routing by selecting a SN in the correct type of CN directly. Re-routing and selection assistance is described in TR 23.720 v0.1.0 and PCR S2-152710.

In an embodiment, the 'DCN selection assistance' information may indicate a type of DCN (e.g. CIoT DCN for the most constrained devices). This information may need to be valid and treated consistently throughout the PLMN. Further, it may need to be understood by RAN nodes for selecting a serving node of a DCN. It may also need to be understood by MME/SGSN/C-SGN and be possible to derive from/to the MMEGI/SGSN Group ID/Null-NRI used in reroute messages. The selection assistance information may be stored for a specific PLMN, and may be used for any subsequent attachment or TAU in the PLMN.

FIG. 11 illustrates a subsequent attachment in the PLMN and subsequent selection of a MME/C-SGN. In step 1101, WCD 202 and a controller (e.g., eNB) in RAN 212 may exchange RRC Connection Request/Setup messages.

In step 1103, WCD 202 may transmit a RRC Connection Setup Complete message that may include an Initial Attach message, DCN Selection Assistance Information, NAS type, and Device type. The Initial Attach message may include a NAS PDU.

In step 1105, the controller of RAN 212 selects a serving node based on the 'DCN selection assistance' information provided in the RRC message. The DCN selection assistance information may include an identifier of a dedicated CN and/or an identifier of a SN to which the WCD was previously attached to in the PLMN. The 'NAS type' and 'Device type' may be used by the RAN controller to verify that the DCN/SN is line with current RAN node configuration, i.e. that the most current network configuration information still indicates the DCN/SN to support the NAS type. If this is not the case, or if the type of DCN or SN is no longer operational in this part of the network, the RAN controller may fall back to an initial selection based on the NAS type. If multiple DCNs/SNs support the NAS type during the initial selection, load balancing according to the DÉCOR specification can be applied.

In step 1107, the Initial Attach is sent to a serving node of the selected SN. The Initial Attach message may include a Default WCD Usage Type.

In step 1109, the Serving Node (e.g. MME, C-SGN) may retrieve the WCD Usage Type from HSS according to the DÉCOR specification.

In step 1111, the Serving Node examines the WCD Usage Types provided by the WCD 202 and the HSS (as available) and may take other information available in the core network into consideration (e.g. device capabilities, SLA information, other subscription information) according to the existing DÉCOR specification to verify that the selected SN or its DCN is suitable for the particular device. The attach procedure continues if the SN and its DCN is suitable. If another SN or DCN should be used, the selected SN may invokes a reroute procedure according to the DÉCOR specification. A reroute may for example be required if the WCD-provided indications have become obsolete, e.g. due to operator network reconfigurations, or if the WCD-provided indications are incorrect for other reasons.

In step 1113, the serving node to which WCD 202 is ultimately attached may provide 'DCN selection assistance' information in the Attach Accept message, which the WCD 202 stores for future use in this PLMN.

Figure 12:
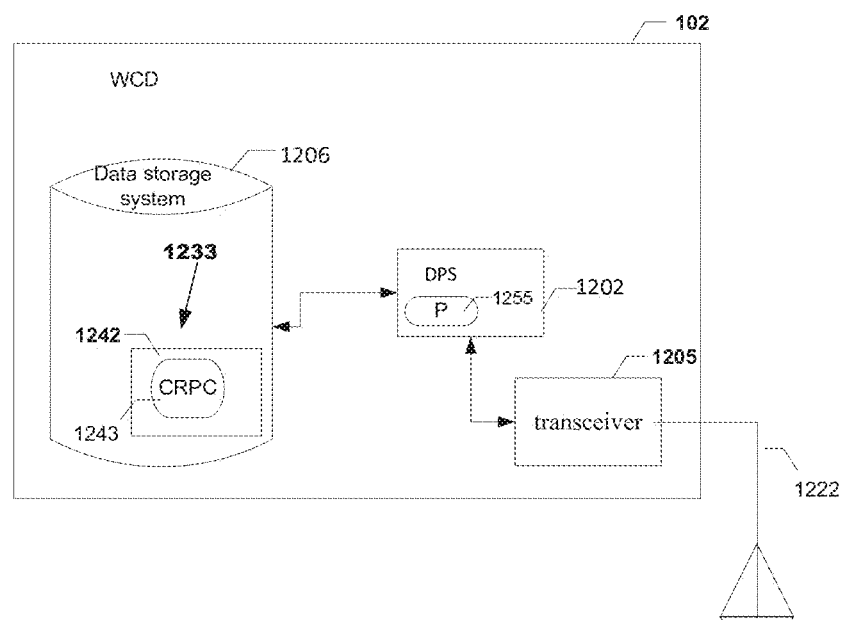
FIG. 12 illustrates an example WCD configured to facilitate the establishing of communication between a WCD and one of a plurality of SNs.

FIG. 12 illustrates a block diagram of an example of the WCD 102. As shown in FIG. 12, WCD 102 includes: the data processing system (DPS) 1202 (which includes, e.g., a digital signal processor (DSP), which may include one or more processors (P) 1255 (e.g., microprocessors) and/or one or more circuits, such as an application specific integrated circuit (ASIC), Field-programmable gate arrays (FPGAs), etc.; a transceiver 1205, and an antenna 1222 for wirelessly transmitting and receiving information; a data storage system 1206, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1202 includes a processor 1255 (e.g., a microprocessor), a computer program product 1233 may be provided, which computer program product includes: computer readable program code 1243 (e.g., instructions), which implements a computer program, stored on a computer readable medium 1242 of data storage system 1206, such as, but not limited, to magnetic media (e.g., a hard disk), optical media (e.g., a DVD), memory devices (e.g., random access memory), etc. In some embodiments, computer readable program code 1243 is configured such that, when executed by data processing system 1202, code 1243 causes the data processing system 1201 to perform steps described herein (e.g., steps shown in FIGS. 4-11).

In some embodiments, WCD 102 is configured to perform steps described above without the need for code 1243. For example, data processing system 1202 may consist merely of specialized hardware, such as one or more application-specific integrated circuits (ASICs). Hence, the features of the present invention described above may be implemented in hardware and/or software. For example, in some embodiments, the functional components of WCD 102 described above may be implemented by data processing system 1202 executing program code 1243, by data processing system 1202 operating independent of any computer program code 1243, or by any suitable combination of hardware and/or software.

In some instances, WCD 102 may include 1) a display screen coupled to the data processing system that enables the data processing system to display information to a user of WCD 102; 2) a speaker coupled to the data processing system that enables the data processing system to output audio to the user of WCD 102; and 3) a microphone coupled to the data processing system that enables the data processing system to receive audio from the user.

Figure 13:
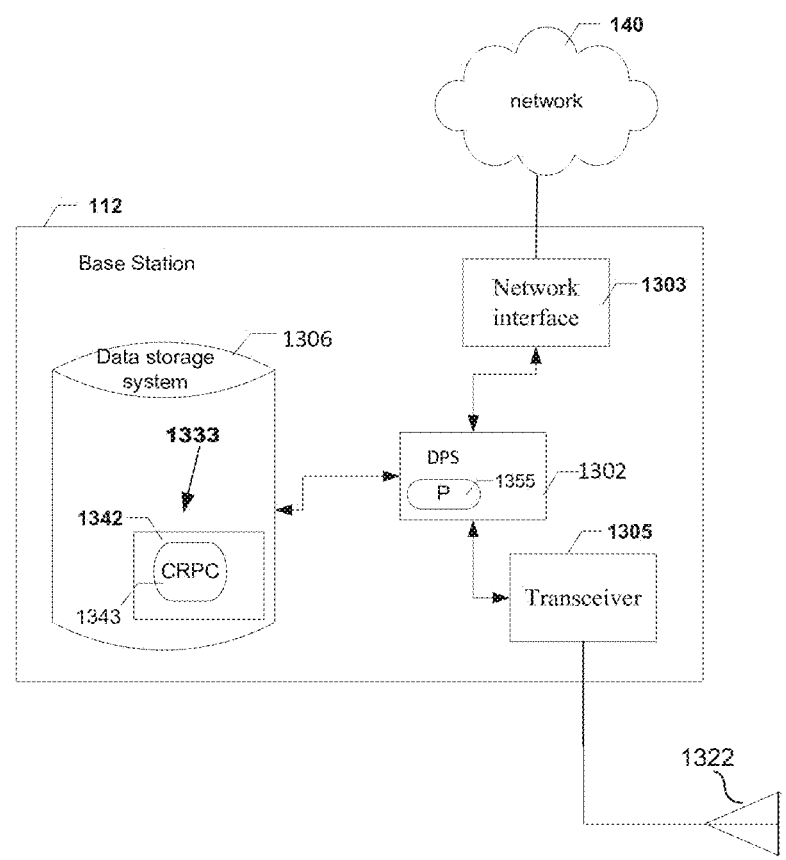
FIG. 13 illustrates an example base station configured to facilitate communication between a WCD and one of a plurality of SNs.

FIG. 13 illustrates a block diagram of a base station 112 and base station controller 1302 according to some embodiments. As shown in FIG. 13, base station 112 may include: a controller 1302 that takes the form of a data processing system 1302, which may include one or more processors (e.g., microprocessors) and/or one or more circuits, such as an application specific integrated circuit (ASIC), Field-programmable gate arrays (FPGAs), etc.; a transceiver 1305 and antenna 1322 for receiving message from, and transmitting messages to, another apparatus such as the WCD; a data storage system 1306, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)), and which may store the tables illustrated in FIG. 3A or 3B. In embodiments where data processing system 1302 includes a processor (e.g., a microprocessor), a computer program product 1333 may be provided, which computer program product includes: computer readable program code 1343 (e.g., instructions), which implements a computer program, stored on a computer readable medium 1342 of data storage system 1606, such as, but not limited, to magnetic media (e.g., a hard disk), optical media (e.g., a DVD), memory devices (e.g., random access memory), etc. In some embodiments, computer readable program code 1343 is configured such that, when executed by data processing system 1302, code 1343 causes the data processing system 1302 to perform steps described herein. In some embodiments, controller 1302 may be configured to perform steps described above without the need for code 1343. For example, data processing system 1302 may consist merely of specialized hardware, such as one or more application-specific integrated circuits (ASICs). Hence, the features of the present invention described above may be implemented in hardware and/or software. The base station 112 may further include a network interface 1303 for communicating with a core network. In a UMTS system, the controller may be located in the core network.

Figure 14:
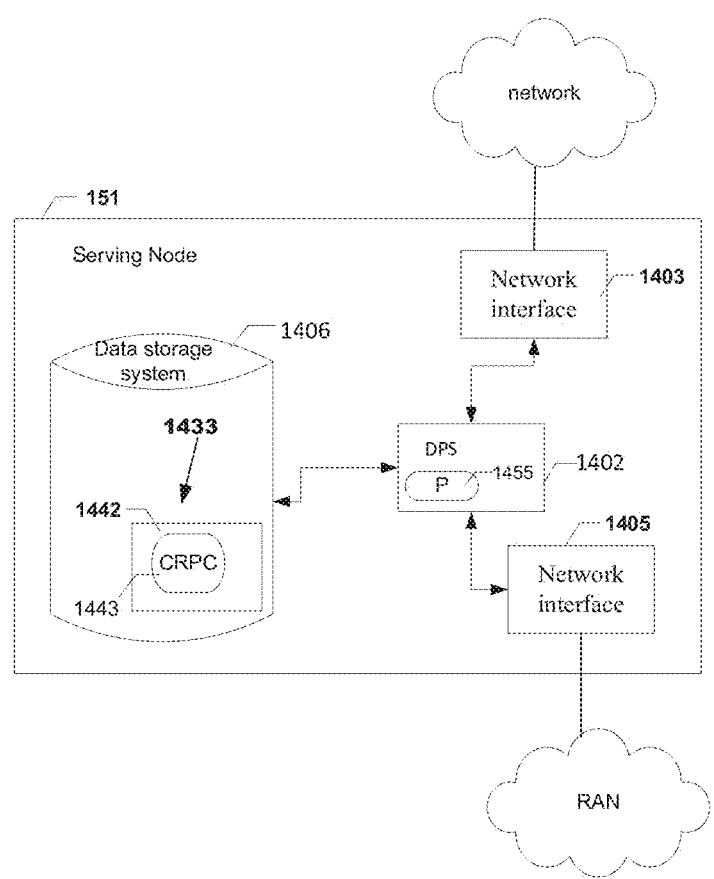
FIG. 14 illustrates an example SN configured to establish communication with a WCD.
Figure 15:
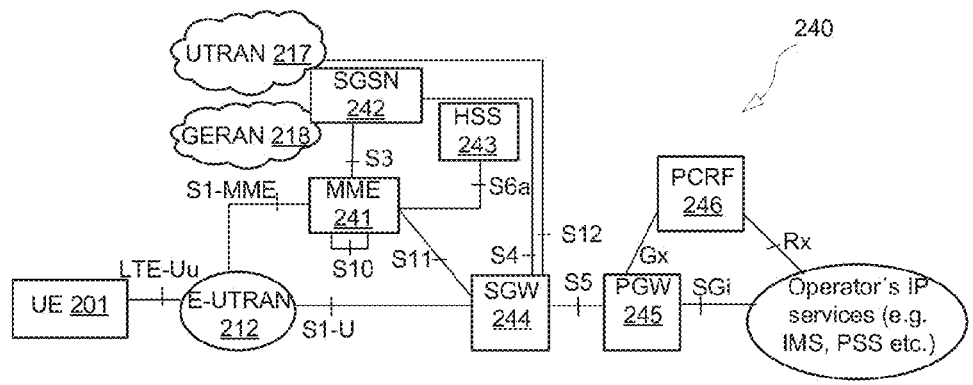
FIG. 15 illustrates an example core network of a LTE system.
Figure 16:
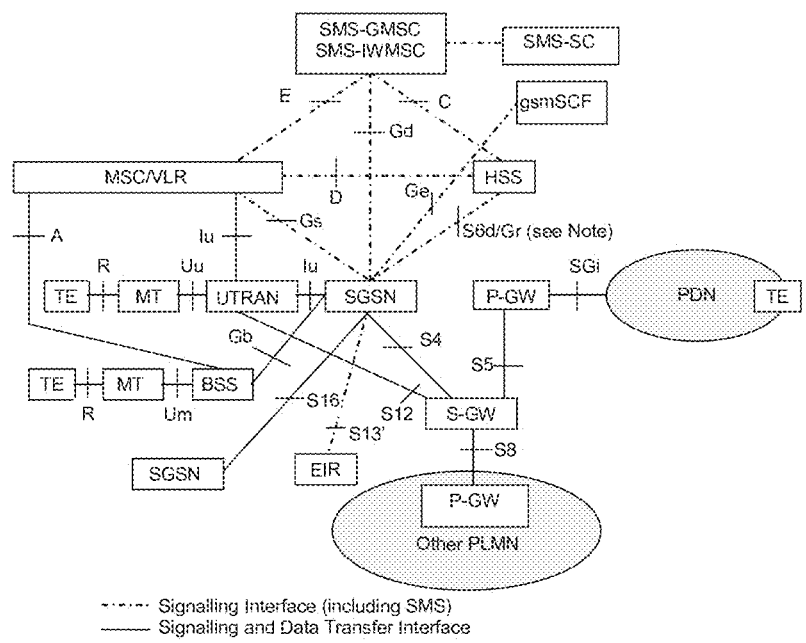
FIG. 16 illustrates an example core network of a UMTS system.

FIG. 14 illustrates a block diagram of a serving node 151 according to some embodiments. As shown in FIG. 14, SN 151 may include: a data processing system 1402, which may include one or more processors 1455 (e.g., microprocessors) and/or one or more circuits, such as an application specific integrated circuit (ASIC), Field-programmable gate arrays (FPGAs), etc.; a base station interface 1405 for receiving message from, and transmitting messages to, a RAN; a network interface 1403 for interfacing with other core network components, a data storage system 1406, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1402 includes a processor (e.g., a microprocessor), a computer program product 1433 may be provided, which computer program product includes: computer readable program code 1443 (e.g., instructions), which implements a computer program, stored on a computer readable medium 1442 of data storage system 1406, such as, but not limited, to magnetic media (e.g., a hard disk), optical media (e.g., a DVD), memory devices (e.g., random access memory), etc. In some embodiments, computer readable program code 1443 is configured such that, when executed by data processing system 1402, code 1443 causes the data processing system 1402 to perform steps described herein. In some embodiments, SN 151 may be configured to perform steps described above without the need for code 1443. For example, data processing system 1402 may consist merely of specialized hardware, such as one or more application-specific integrated circuits (ASICs). Hence, the features of the present invention described above may be implemented in hardware and/or software.

Some embodiments described above may be summarized in the following manner:

A first embodiment is directed to a method of establishing communication between a wireless communication device (WCD) and one of a plurality of serving nodes (SNs) that are each in communication with a base station and that are each configured to perform mobility management for WCDs and to perform session management between WCDs and a core network (CN). The method comprises:

the WCD determining information that identifies which WCD-SN protocol type, from among a plurality of WCD-SN protocol types, is supported by the WCD or is being used by the WCD, wherein each of the WCD-SN protocol types is a version, variant, or subset of a protocol used by one of the SNs to support mobility management of WCDs and to support session management between WCDs and the SN's core network (CN), and wherein the identified WCD-SN protocol type is compatible with one or more of the plurality of serving nodes and is not compatible with another one or more of the plurality of serving nodes; and the WCD transmitting, to a base station controller, a message that includes the information that identifies which WCD-SN protocol type is supported by the WCD or is being used by the WCD.

The WCD-SN protocol types may be a non-access stratum (NAS) type.

The base station controller may be located in an evolved nodeB (eNB).

The serving node may be a mobility management entity (MME),

The WCD may be a UE.

The message may include a network attach message or a tracking area update (TAU) message.

In the first embodiment, the identified WCD-SN protocol type may correspond to a version, variant, or subset of the WCD-SN protocol that has a different set of mandatory parameters compared with a version, variant, or subset of the WCD-SN protocol corresponding to another WCD-SN protocol type.

In the first embodiment, the method may further comprise:

the WCD determining a device type of the WCD that identifies capabilities of the WCD; and the WCD transmitting, in the message to the base station controller, the device type of the WCD.

In the first embodiment, the message may be a radio resource control (RRC) message that includes a parameter portion, which may include parameter values to be communicated to the base station controller, and a payload portion, which includes payload data that is to be forwarded by the base station controller to the selected SN and that will not be parsed by the base station controller. The method may further comprise:

the WCD determining a WCD usage type of the WCD, wherein the WCD usage type indicates data traffic characteristics to be expected from the WCD; and the WCD transmitting the WCD usage type in the payload portion of the RRC message, wherein the WCD-SN protocol type information and device type information are transmitted in the parameter portion of the RRC message.

In the first embodiment, the information that identifies the WCD-SN protocol type may be stored on a subscriber identity module (SIM), universal subscriber identity module (USIM), or universal integrated circuit card (UICC) in the WCD.

In the first embodiment, the method may further comprise the WCD receiving (406), from one of a plurality of core networks, an attachment acceptance message which indicates that the WCD will or has communicatively attached to the core network (CN), and which includes selection assistance information which identifies the core network as a core network (140, 150, 160, 170) to which the WCD should attach for any future attachment request, or which identifies the core network's type as a type of core network which the WCD should attach for any future attachment request.

Some other embodiments described above may be summarized in the following manner:

A second embodiment is directed to a method of facilitating communication between a wireless communication device (WCD) and one of a plurality of serving nodes (SNs) that are each in communication with a base station and that are each configured to perform mobility management for WCDs and to perform session management between WCDs and a core network (CN). The method comprises:

a base station controller of the base station receiving, from the WCD, a message that includes information identifying which WCD-SN protocol type, from among a plurality of WCD-SN protocol types, is supported by the WCD or is being used by the WCD, wherein each of the WCD-SN protocol types is a variant, subset or version of a protocol used by one of the SNs to support mobility management of WCDs and to support session management between WCDs and the SN's core network (CN), and wherein the identified WCD-SN protocol type is compatible with a first set of one or more of the plurality of SNs and is not compatible with a second set of another one or more of the plurality of SNs; and the base station controller selecting, based on the identified WCD-SN protocol type, one of the plurality of SNs, wherein the selected SN is from the first set of one or more SNs; and the base station controller transmitting, to the selected SN, a request for the WCD to communicatively attach with selected SN.

In the second embodiment, each of the WCD-SN protocol types may be a non-access stratum (NAS) type, the base station controller may be located in an evolved nodeB (eNB), the WCD may be a UE, the message may include a network attach message or a tracking area update (TAU) message, and the selected SN may be a mobility management entity (MME) (241, 251, 252).

In the second embodiment, the received message from the WCD may further identify a device type of the WCD that identifies capabilities of the WCD, wherein the base station controller's selection of the one of the plurality of CNs may further be based on the WCD's device type.

In the second embodiment, the received message may be part of a radio resource control (RRC) message that has a parameter portion, which includes the WCD-SN protocol type and the WCD's device type, and a payload portion, which includes a WCD usage type that indicates data traffic characteristics to be expected from the WCD, the wherein the base station controller's selection of the one of the plurality of SNs is not based on the WCD usage type, the method further comprising the base station controller transmitting the payload portion, as part of the request for the WCD to communicatively attach with the selected SN.

In the second embodiment, the first set of one or more SNs that are compatible with the identified WCD-SN protocol type may include a first SN and a second SN, wherein the selected SN is the first CN. The method may further comprise:

the base station controller receiving, from the selected CN, an indication that the WCD is to be communicatively attached with the second SN;

the base station controller transmitting a request to the second SN for the WCD to be communicatively attached with the second SN;

the base station controller receiving from the second SN, and forwarding to the WCD, an attachment acceptance message that indicates communicative attachment of the WCD with the second SN's CN and that includes selection assistance information which identifies the second SN's CN as a core network to which the WCD should attach for any future attachment request or which identifies the CN's core network type as a type of CN to which the WCD should attach to for any future attachment request.

In the second embodiment, the method may further comprise:

the base station controller receiving, from the WCD, a subsequent request to communicatively attach with one of the plurality of SNs, the request including the information identifying the WCD-SN protocol type supported or being used by the WCD and selection assistance information that indicates which type of core network, from among a plurality of core network types, the WCD should attach to;

the base station controller determining whether i) the type of the core network identified in the selection assistance information is identified in configuration data stored in the base station, ii) the type of the core network is compatible with the WCD-SN protocol type, and iii) the type of the core network is operational; and the base station controller selecting a CN having the type of CN and selecting a SN in the selected CN for communicative attachment with the WCD.

In the second embodiment, the WCD uses or supports a first WCD-SN protocol type of the plurality of WCD-SN protocol types, and one of the plurality of SNs uses or supports a second WCD-SN protocol type that is a different one of the WCD-SN protocol types, wherein the first WCD-SN protocol type represents one version, one variant, or one subset of the protocol used to accomplish session management (SM) and mobility management (MM), wherein the second WCD-SN protocol type represents a different version, different variant, or different subset of the same protocol, and wherein WCD and the one of the plurality of SNs are unable to correctly interpret any session management message based on the protocol or any mobility management message based on the protocol exchanged between each other.

In the second embodiment, the one version, variant, or subset of the protocol and the different version, variant, or subset of the same protocol each uses a different information element or different set of parameters to generate mobility management messages or session management messages.

A third embodiment is directed to a method of establishing communication between a wireless communication device (WCD) and one of a plurality of serving nodes (SNs) that are each in communication with a base station and that are each configured to perform mobility management for WCDs and to perform session management between WCDs and a core network (CN). The method comprises:

the SN receiving, from a base station, a message that requests communicative attachment between the WCD and the SN, wherein the message identifies a first WCD usage type of the WCD, wherein the first WCD usage type identifies data traffic characteristics to be expected from the WCD;

the SN obtaining, from a subscriber database in the SN's CN, a second WCD usage type of the WCD, wherein the second WCD usage type identifies data traffic characteristics to be expected from the WCD;

the SN determining, based on the first WCD usage type and the second WCD usage type, whether to re-route the WCD to an SN belonging to a CN of a different type, wherein the WCD is using or supports one of a plurality of versions, variants, or subsets of a WCD-SN protocol that is used by the SNs in that other CN type to support mobility management of the WCDs and to support session management between the WCDs and the SN's core network (CN), wherein the SN and the another SN are compatible with the version, variant, or subset of the protocol being used or supported by the WCD, and are not compatible with one or more other versions of the protocol; and in response to determining not to re-route the WCD, the SN transmitting, to the WCD via the base station, an attachment acceptance message which indicates that the WCD is or will be communicatively attached to the SN's CN, wherein the attachment acceptance message includes selection assistance information which identifies a core network type as a type of CN to which the WCD should attach for any future attachment request (e.g., in this PLMN);

in response to determining to re-route the WCD, the SN transmitting, to the base station, a re-route message which indicates that the WCD is to be re-routed to an SN of the another CN or particular one of the SNs that is compatible with the version, variant, or subset of the protocol being used or supported by the WCD and with the first and second WCD usage types.

In the third embodiment, the step of determining whether to re-route the WCD to an SN in another type of CN may comprise determining whether the re-routing would improve load balance among the SN and the another SN.

In the third embodiment, the step of determining whether to re-route the WCD to an SN in another type of CN may further be based on at least one of: (i) information stored in the subscriber database that indicates device capabilities of the WCD, and (ii) service level agreement (SLA) information stored in the first CN for the WCD.

A fourth embodiment is directed to a wireless communication device (WCD) configured to establish communication with one of a plurality of serving nodes (SNs) that are each in communication with a base station and that are each configured to perform mobility management for WCDs and to perform session management between WCDs and a core network (CN). The WCD may comprise one or more processors configured to:

determine information that identifies which WCD-SN protocol type, from among a plurality of WCD-SN protocol types, is supported by the WCD or is being used by the WCD, wherein each of the WCD-SN protocol types is a variant, subset or version of a protocol used by one of the SNs to support mobility management of WCDs and to support session management between WCDs and the SN's core network (CN), and wherein the identified WCD-SN protocol type is compatible with one or more of the plurality of serving nodes and is not compatible with another one or more of the plurality of serving nodes;

transmit, to a base station controller, a message that includes the information that identifies which WCD-SN protocol type is supported by the WCD or is being used by the WCD.

In the fourth embodiment, each of the WCD-SN protocol types may be a non-access stratum (NAS) type, the base station controller may be located in an evolved nodeB (eNB), the serving node may be a mobility management entity (MME), the WCD may be a UE, and the message may include a network attach message or a tracking area update (TAU) message.

In the fourth embodiment, the identified WCD-SN protocol type may correspond to a version, variant, or subset of the WCD-SN protocol that has a different set of mandatory parameters compared with a version, variant, or subset of the WCD-SN protocol corresponding to another WCD-SN protocol type.

In the fourth embodiment, the one or more processors may be further configured to:

determine a device type of the WCD that identifies capabilities of the WCD; and transmit, in the message to the base station controller, the device type of the WCD.

In the fourth embodiment, the message may be a radio resource control (RRC) message that includes a parameter portion, which includes parameter values to be communicated to the base station controller, and a payload portion, which includes payload data that is to be forwarded by the base station controller to the selected SN and that will not be parsed by the base station controller. The one or more processors may further be configured to:

determine a WCD usage type of the WCD, wherein the WCD usage type indicates data traffic characteristics to be expected from the WCD; and transmit the WCD usage type in the payload portion of the RRC message, wherein the WCD-SN protocol type information and device type information are transmitted in the parameter portion of the RRC message.

In the fourth embodiment, the information that identifies the WCD-SN protocol type may be stored on a subscriber identity module (SIM), universal subscriber identity module (USIM), or universal integrated circuit card (UICC) in the WCD.

In the fourth embodiment, the one or more processors may further be configured to receive, from one of a plurality of core networks, an attachment acceptance message which indicates that the WCD will or has communicatively attached to the core network (CN), and which includes selection assistance information which identifies the core network as a core network to which the WCD should attach for any future attachment request, or which identifies the core network's type as a type of core network which the WCD should attach for any future attachment request.

A fifth embodiment is directed to a base station controller configured to facilitate communication between a wireless communication device (WCD) and one of a plurality of serving nodes (SNs) that are each in communication with a base station controlled by the base station controller and that are each configured to perform mobility management for WCDs and to perform session management between WCDs and a core network (CN). The base station controller comprises one or more processors configured to:

receive, from the WCD, a message that includes information identifying which WCD-SN protocol type, from among a plurality of WCD-SN protocol types, is supported by the WCD or is being used by the WCD, wherein each of the WCD-SN protocol types is a variant, subset or version of a protocol used by one of the SNs to support mobility management of WCDs and to support session management between WCDs and the SN's core network (CN), and wherein the identified WCD-SN protocol type is compatible with a first set of one or more of the plurality of SNs and is not compatible with a second set of another one or more of the plurality of SNs; and select, based on the identified WCD-SN protocol type, one of the plurality of SNs, wherein the selected SN is from the first set of one or more SNs; and transmit, to the selected SN, a request for the WCD to communicatively attach with selected SN.

In the fifth embodiment, each of the WCD-SN protocol types may be a non-access stratum (NAS) type, the base station controller may be located in an evolved nodeB (eNB), the WCD may be a UE, the message may include a network attach message or a tracking area update (TAU) message, and the selected SN may be a mobility management entity (MME).

In the fifth embodiment, the received message from the WCD may further identify a device type of the WCD that identifies capabilities of the WCD, wherein the base station controller's selection of the one of the plurality of CNs may further be based on the WCD's device type.

In the fifth embodiment, the received message may be part of a radio resource control (RRC) message that has a parameter portion, which includes the WCD-SN protocol type and the WCD's device type, and a payload portion, which includes a WCD usage type that indicates data traffic characteristics to be expected from the WCD, the wherein the base station controller's selection of the one of the plurality of SNs is not based on the WCD usage type, the one or more processors further configured to transmit the payload portion, as part of the request for the WCD to communicatively attach with the selected SN.

In the fifth embodiment, the first set of one or more SNs that are compatible with the identified WCD-SN protocol type may include a first SN and a second SN, wherein the selected SN is the first SN. The one or more processors may further be configured to:

receive, from the selected SN, an indication that the WCD is to be communicatively attached with the second SN;

transmit a request to the second SN for the WCD to be communicatively attached with the second SN;

receive, from the second SN, and forwarding to the WCD, an attachment acceptance message that indicates communicative attachment of the WCD with the second SN's CN and that includes selection assistance information which identifies the second SN's CN as a core network to which the WCD should attach for any future attachment request or which identifies the CN's core network type as a type of CN to which the WCD should attach to for any future attachment request.

In the fifth embodiment, the one or more processors may further be configured to receive, from the WCD, a subsequent request to communicatively attach with one of the plurality of SNs, the request including the information identifying the WCD-SN protocol type supported or being used by the WCD and selection assistance information that indicates which type of core network, from among a plurality of core network types, the WCD should attach to;

the base station controller determining whether i) the type of the core network identified in the selection assistance information is identified in configuration data stored in the base station, ii) the type of the core network is compatible with the WCD-SN protocol type, and iii) the type of the core network is operational; and the base station controller selecting a CN having the type of CN and selecting a SN in the selected CN for communicative attachment with the WCD.

In the fifth embodiment, the WCD uses or supports a first WCD-SN protocol type of the plurality of WCD-SN protocol types, and one of the plurality of SNs uses or supports a second WCD-SN protocol type that is a different one of the WCD-SN protocol types, wherein the first WCD-SN protocol type represents one version, one variant, or one subset of the protocol used to accomplish session management (SM) and mobility management (MM), wherein the second WCD-SN protocol type represents a different version, different variant, or different subset of the same protocol, and wherein WCD and the one of the plurality of SNs are unable to correctly interpret any session management message based on the protocol or any mobility management message based on the protocol exchanged between each other.

In the fifth embodiment, the one version, variant, or subset of the protocol and the different version, variant, or subset of the same protocol each uses a different information element or different set of parameters to generate mobility management messages or session management messages.

A sixth embodiment is directed to a serving node, of one of a plurality of serving nodes (SNs), configured to establish communication between a wireless communication device (WCD) and one of the plurality of SNs, which are each in communication with a base station and each configured to perform mobility management for WCDs and to perform session management between WCDs and a core network (CN). The serving node comprises one or more processors configured to:

receive, from a base station, a message that requests communicative attachment between the WCD and the SN, wherein the message identifies a first WCD usage type of the WCD, wherein the first WCD usage type identifies data traffic characteristics to be expected from the WCD;

obtain, from a subscriber database in the SN's CN, a second WCD usage type of the WCD, wherein the second WCD usage type identifies data traffic characteristics to be expected from the WCD;

determine, based on the first WCD usage type and the second WCD usage type, whether to re-route the WCD to a SN in another type of CN, wherein the WCD is using or supports one of a plurality of versions, variants, or subsets of a WCD-SN protocol that is used by the SN to support mobility management of the WCDs and to support session management between the WCDs and the SN's core network (CN), wherein the SN and the another SN are compatible with the version, variant, or subset of the protocol being used or supported by the WCD, and are not compatible with one or more other versions, variants, or subsets of the protocol; and in response to determining not to re-route the WCD, transmit, to the WCD via the base station, an attachment acceptance message which indicates that the WCD is or will be communicatively attached to the SN's CN, wherein the attachment acceptance message includes selection assistance information which identifies a core network type as a type of CN to which the WCD should attach for any future initial attachment request in this PLMN;

in response to determining to re-route the WCD, transmit, to the base station, a re-route message which indicates that the WCD is to be re-routed to the another one of the SNs that is compatible with the version, variant, or subset of the protocol being used or supported by the WCD and with the first and second WCD usage types.

In the sixth embodiment, the one or more processors may be configured to determine whether to re-route the WCD to another one of the SNs by determining whether the re-routing would improve load balance among the SN and the another SN.

In the sixth embodiment, the one or more processors may be configured to determine whether to re-route the WCD to an SN of another type of CN further based on at least one of:

(i) information stored in the subscriber database that indicates device capabilities of the WCD, and (ii) service level agreement (SLA) information stored in the first CN for the WCD.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of establishing communication between a wireless communication device (WCD) and one of a plurality of serving nodes (SNs) that are each in communication with a base station and that are each configured to perform mobility management for WCDs and to perform session management between WCDs and a core network (CN), the method comprising:
   the WCD determining information that identifies which WCD-SN protocol type, from among a plurality of WCD-SN protocol types, is supported by the WCD or is being used by the WCD, wherein each of the WCD-SN protocol types is a version, variant, or subset of a protocol used by one of the SNs to support mobility management of WCDs and to support session management between WCDs and the SN's core network (CN), and
   wherein the identified WCD-SN protocol type: (i) is compatible with one or more of the plurality of serving nodes, (ii) is not compatible with another one or more of the plurality of serving nodes, and (iii) corresponds to a variant, subset or version of the WCD-SN protocol that has a different set of mandatory parameters compared with a version, variant, or subset of the WCD-SN protocol corresponding to another WCD-SN protocol type; and
   the WCD transmitting, to a base station controller, a message that includes the information that identifies which WCD-SN protocol type is supported by the WCD or is being used by the WCD.

2. The method of claim 1, wherein:
   each of the WCD-SN protocol types is a non-access stratum (NAS) type,
   the base station controller is located in an evolved nodeB (eNB),
   the serving node is a mobility management entity (MME),
   the WCD is a UE, and
   the message includes a network attach message or a tracking area update (TAU) message.

3. The method of claim 2, further comprising:
   the WCD determining a device type of the WCD that identifies capabilities of the WCD; and
   the WCD transmitting, in the message to the base station controller, the device type of the WCD.

4. The method of claim 3, wherein the message is a radio resource control (RRC) message that includes a parameter portion, which includes parameter values to be communicated to the base station controller, and a payload portion, which includes payload data that is to be forwarded by the base station controller to the selected SN and that will not be parsed by the base station controller, the method further comprising:
   the WCD determining a WCD usage type of the WCD, wherein the WCD usage type indicates data traffic characteristics to be expected from the WCD; and
   the WCD transmitting the WCD usage type in the payload portion of the RRC message, wherein the WCD-SN protocol type information and device type information are transmitted in the parameter portion of the RRC message.

5. The method of claim 1, wherein the information that identifies the WCD-SN protocol type is stored on a subscriber identity module (SIM), universal subscriber identity module (USIM), or universal integrated circuit card (UICC) in the WCD.

6. The method of claim 1, further comprising the WCD receiving, from one of a plurality of core networks, an attachment acceptance message which indicates that the WCD will or has communicatively attached to the core network (CN), and which includes selection assistance information which identifies the core network as a core network to which the WCD should attach for any future attachment request, or which identifies the core network's type as a type of core network which the WCD should attach for any future attachment request.

7. A method of facilitating communication between a wireless communication device (WCD) and one of a plurality of serving nodes (SNs) that are each in communication with a base station and that are each configured to perform mobility management for WCDs and to perform session management between WCDs and a core network (CN), the method comprising:
   a base station controller of the base station receiving, from the WCD, a message that includes information identifying which WCD-SN protocol type, from among a plurality of WCD-SN protocol types, is supported by the WCD or is being used by the WCD,
   wherein each of the WCD-SN protocol types is a version, variant, or subset of a protocol used by one of the SNs to support mobility management of WCDs and to support session management between WCDs and the SN's core network (CN), and
   wherein the identified WCD-SN protocol type: (i) is compatible with a first set of one or more of the plurality of SNs, (ii) is not compatible with a second set of another one or more of the plurality of SNs, and (iii) corresponds to a variant, subset or version of the WCD-SN protocol that has a different set of mandatory parameters compared with a version, variant, or subset of the WCD-SN protocol corresponding to another WCD-SN protocol type; and
   the base station controller selecting, based on the identified WCD-SN protocol type, one of the plurality of SNs, wherein the selected SN is from the first set of one or more SNs; and
   the base station controller transmitting, to the selected SN, a request for the WCD to communicatively attach with selected SN.

8. The method of claim 7, wherein:
   each of the WCD-SN protocol types is a non-access stratum (NAS) type,
   the base station controller is located in an evolved nodeB (eNB),
   the WCD is a UE, the message includes a network attach message or a tracking area update (TAU) message, and the selected SN is a mobility management entity (MME).

9. The method of claim 8, wherein the received message from the WCD further identifies a device type of the WCD that identifies capabilities of the WCD, wherein the base station controller's selection of the one of the plurality of CNs is further based on the WCD's device type.

10. The method of claim 9, wherein the received message is part of a radio resource control (RRC) message that has a parameter portion, which includes the WCD-SN protocol type and the WCD's device type, and a payload portion, which includes a WCD usage type that indicates data traffic characteristics to be expected from the WCD, the wherein the base station controller's selection of the one of the plurality of SNs is not based on the WCD usage type, the method further comprising the base station controller transmitting the payload portion, as part of the request for the WCD to communicatively attach with the selected SN.

11. The method of claim 10, wherein the first set of one or more SNs that are compatible with the identified WCD-SN protocol type includes a first SN and a second SN, wherein the selected SN is the first SN, the method further comprising:

the base station controller receiving, from the selected SN, an indication that the WCD is to be communicatively attached with the second SN;

the base station controller transmitting a request to the second SN for the WCD to be communicatively attached with the second SN;

the base station controller receiving from the second SN, and forwarding to the WCD, an attachment acceptance message that indicates communicative attachment of the WCD with the second SN's CN and that includes selection assistance information which identifies the second SN's CN as a core network to which the WCD should attach for any future attachment request or which identifies the CN's core network type as a type of CN to which the WCD should attach to for any future attachment request; and the base station controller transmitting the attachment acceptance message to the WCD.

12. The method of claim 11, further comprising:

the base station controller receiving, from the WCD, a subsequent request to communicatively attach with one of the plurality of SNs, the request including the information identifying the WCD-SN protocol type supported or being used by the WCD and selection assistance information that indicates which type of core network, from among a plurality of core network types, the WCD should attach to;

the base station controller determining whether i) the type of the core network identified in the selection assistance information is identified in configuration data stored in the base station, ii) the type of the core network is compatible with the WCD-SN protocol type, and iii) the type of the core network is operational; and the base station controller selecting a CN having the type of CN and selecting a SN in the selected CN for communicative attachment with the WCD.

13. The method of claim 7, wherein the WCD uses or supports a first WCD-SN protocol type of the plurality of WCD-SN protocol types, and one of the plurality of SNs uses or supports a second WCD-SN protocol type that is a different one of the WCD-SN protocol types, wherein the first WCD-SN protocol type represents one version, one variant, or one subset of the protocol used to accomplish session management (SM) and mobility management (MM), wherein the second WCD-SN protocol type represents a different version, different variant, or different subset of the same protocol, and wherein WCD and the one of the plurality of SNs are unable to correctly interpret any session management message based on the protocol or any mobility management message based on the protocol exchanged between each other.

14. The method of claim 13, wherein the one version, variant, or subset of the protocol and the different version, variant, or subset of the same protocol each uses a different information element or different set of parameters to generate mobility management messages or session management messages.

15. A method of establishing communication between a wireless communication device (WCD) and one of a plurality of serving nodes (SNs) that are each in communication with a base station and that are each configured to perform mobility management for WCDs and to perform session management between WCDs and a core network (CN), the method comprising:

the SN receiving, from a base station, a message that requests communicative attachment between the WCD and the SN, wherein the message identifies a first WCD usage type of the WCD, wherein the first WCD usage type identifies data traffic characteristics to be expected from the WCD;

the SN obtaining, from a subscriber database in the SN's CN, a second WCD usage type of the WCD, wherein the second WCD usage type identifies data traffic characteristics to be expected from the WCD;

the SN determining, based on the first WCD usage type and the second WCD usage type, whether to re-route the WCD to another one of the SNs, wherein the WCD is using or supports one of a plurality of versions, variants, or subsets of a WCD-SN protocol that is used by the SN to support mobility management of the WCDs and to support session management between the WCDs and the SN's core network (CN), wherein the SN and the another SN are compatible with the version, variant, or subset of the protocol being used or supported by the WCD, and are not compatible with one or more other versions, variants, or subsets of the protocol; and in response to determining not to re-route the WCD, the SN transmitting, to the WCD via the base station, an attachment acceptance message which indicates that the WCD is or will be communicatively attached to the SN's CN, wherein the attachment acceptance message includes selection assistance information which identifies a core network type of the CN as a type of core network to which the WCD should attach for any future attachment request;

in response to determining to re-route the WCD, the SN transmitting, to the base station, a re-route message which indicates that the WCD is to be re-routed to the another one of the SNs that is compatible with the version, variant, or subset of the protocol being used or supported by the WCD and with the first and second WCD usage types.

16. The method of claim 15, wherein the step of determining whether to re-route the WCD to another one of the SNs comprises determining whether the re-routing would improve load balance among the SN and the another SN.

17. The method of claim 15, wherein the step of determining whether to re-route the WCD to another one of the SNs is further based on at least one of: (i) information stored in the subscriber database that indicates device capabilities of the WCD, and (ii) service level agreement (SLA) information stored in the first CN for the WCD.

18. A wireless communication device (WCD) configured to establish communication with one of a plurality of serving nodes (SNs) that are each in communication with a base station and that are each configured to perform mobility management for WCDs and to perform session management between WCDs and a core network (CN), the WCD comprising one or more processors configured to:
  determine information that identifies which WCD-SN protocol type, from among a plurality of WCD-SN protocol types, is supported by the WCD or is being used by the WCD,
    wherein each of the WCD-SN protocol types is a version, variant, or subset of a protocol used by one of the SNs to support mobility management of WCDs and to support session management between WCDs and the SN's core network (CN), and
    wherein the identified WCD-SN protocol type: (i) is compatible with one or more of the plurality of serving nodes, (ii) is not compatible with another one or more of the plurality of serving nodes, and (iii) corresponds to a variant, subset or version of the WCD-SN protocol that has a different set of mandatory parameters compared with a version, variant, or subset of the WCD-SN protocol corresponding to another WCD-SN protocol type; and
  transmit, to a base station controller, a message that includes the information that identifies which WCD-SN protocol type is supported by the WCD or is being used by the WCD.

19. A base station controller configured to facilitate communication between a wireless communication device (WCD) and one of a plurality of serving nodes (SNs) that are each in communication with a base station controlled by the base station controller and that are each configured to perform mobility management for WCDs and to perform session management between WCDs and a core network (CN), the base station controller comprising one or more processors configured to:
  receive, from the WCD, a message that includes information identifying which WCD-SN protocol type, from among a plurality of WCD-SN protocol types, is supported by the WCD or is being used by the WCD, wherein each of the WCD-SN protocol types is a version, variant, or subset of a protocol used by one of the SNs to support mobility management of WCDs and to support session management between WCDs and the SN's core network (CN), and wherein the identified WCD-SN protocol type is compatible with a first set of one or more of the plurality of SNs and is not compatible with a second set of another one or more of the plurality of SNs; and select, based on the identified WCD-SN protocol type, one of the plurality of SNs, wherein the selected SN is from the first set of one or more SNs; and
  transmit, to the selected SN, a request for the WCD to communicatively attach with selected SN.

20. A serving node, of one of a plurality of serving nodes (SNs), configured to establish communication between a wireless communication device (WCD) and one of the plurality of SNs, which are each in communication with a base station and each configured to perform mobility management for WCDs and to perform session management between WCDs and a core network (CN), the serving node comprising one or more processors configured to:
  receive, from a base station, a message that requests communicative attachment between the WCD and the SN, wherein the message identifies a first WCD usage type of the WCD, wherein the first WCD usage type identifies data traffic characteristics to be expected from the WCD;
  obtain, from a subscriber database in the SN's CN, a second WCD usage type of the WCD, wherein the second WCD usage type identifies data traffic characteristics to be expected from the WCD;
  determine, based on the first WCD usage type and the second WCD usage type, whether to re-route the WCD to another one of the SNs, wherein the WCD is using or supports one of a plurality of versions, variants, or subsets of a WCD-SN protocol that is used by the SN to support mobility management of the WCDs and to support session management between the WCDs and the SN's core network (CN), wherein the SN and the another SN are compatible with the version, variant, or subset of the protocol being used or supported by the WCD, and are not compatible with one or more other versions, variants, or subsets of the protocol; and
  in response to determining not to re-route the WCD, transmit, to the WCD via the base station, an attachment acceptance message which indicates that the WCD is or will be communicatively attached to the SN's CN, wherein the attachment acceptance message includes selection assistance information which identifies a core network type of the CN as a type of core network to which the WCD should attach for any future attachment request;
  in response to determining to re-route the WCD, transmit, to the base station, a re-route message which indicates that the WCD is to be re-routed to the another one of the SNs that is compatible with the version, variant, or subset of the protocol being used or supported by the WCD and with the first and second WCD usage types.

* * * * *